US010349642B2

(12) United States Patent
Hidaka et al.

(10) Patent No.: US 10,349,642 B2
(45) Date of Patent: Jul. 16, 2019

(54) FISHHOOK

(71) Applicants: NIPPON SODA CO., LTD., Tokyo (JP); GLOBERIDE, Inc, Higashikurume-shi, Tokyo (JP)

(72) Inventors: Tomoya Hidaka, Ichihara (JP); Tokuo Ichikawa, Higashikurume (JP); Yukio Okishima, Higashikurume (JP); Yasuhisa Shibata, Ichihara (JP)

(73) Assignees: NIPPON SODA CO., LTD., Tokyo (JP); GLOBERIDE, INC., Tokyo (JP)

( * ) Notice: Subject to any disclaimer, the term of this patent is extended or adjusted under 35 U.S.C. 154(b) by 271 days.

(21) Appl. No.: 15/504,069

(22) PCT Filed: Aug. 28, 2015

(86) PCT No.: PCT/JP2015/004361
§ 371 (c)(1),
(2) Date: Feb. 15, 2017

(87) PCT Pub. No.: WO2016/035301
PCT Pub. Date: Mar. 10, 2016

(65) Prior Publication Data
US 2017/0251648 A1    Sep. 7, 2017

(30) Foreign Application Priority Data
Sep. 5, 2014    (JP) .................. 2014-180793

(51) Int. Cl.
*A01K 83/00*    (2006.01)
*C23C 22/05*    (2006.01)
(Continued)

(52) U.S. Cl.
CPC .............. *A01K 83/00* (2013.01); *C23C 22/02* (2013.01); *C23C 22/05* (2013.01); *C23C 22/78* (2013.01);
(Continued)

(58) Field of Classification Search
CPC ........ A01K 83/00; C23C 22/02; C23C 22/05; B05D 5/08
(Continued)

(56) References Cited

U.S. PATENT DOCUMENTS 3,875,302 A * 4/1975 Inoue ..................... A01C 21/00
426/1
4,928,423 A * 5/1990 Furuta .................... A01K 83/00
43/43.16

(Continued)

FOREIGN PATENT DOCUMENTS

EP    1484105 A1    12/2004
EP    1621258 A1    2/2006
(Continued)

OTHER PUBLICATIONS

Mar. 7, 2017 International Preliminary Report on Patentability issued in International PCT/JP2015/004361.
(Continued)

*Primary Examiner* — Christopher P Ellis
(74) *Attorney, Agent, or Firm* — Oliff PLC

(57) ABSTRACT

An object of the invention is to provide a fishhook for fishing or the like, the fishhook being easily stuck to a fish or the like and being also excellent in durability. The surface of a fishhook is treated with a compound selected from the group consisting of a metallic surfactant having at least one or more hydroxyl groups or hydrolyzable groups, a fluorine-based surface treating agent, a thiol compound and a disulfide compound.

2 Claims, 1 Drawing Sheet

(51) Int. Cl.
*C23C 22/78* (2006.01)
*C23C 22/02* (2006.01)
*C23C 22/83* (2006.01)
*B05D 5/08* (2006.01)
*B05D 1/18* (2006.01)

(52) U.S. Cl.
CPC .............. *C23C 22/83* (2013.01); *B05D 1/18* (2013.01); *B05D 5/08* (2013.01); *B05D 2258/00* (2013.01); *B05D 2518/10* (2013.01); *C23C 2222/20* (2013.01)

(58) Field of Classification Search
USPC ........................................... 43/43.16
See application file for complete search history.

(56) References Cited

U.S. PATENT DOCUMENTS

| | | |
|---|---|---|
| 5,084,998 A | 2/1992 | Dixon |
| 5,143,750 A | 9/1992 | Yamagata et al. |
| 5,388,366 A * | 2/1995 | Kretschmer ........... A01K 83/00 43/42.32 |
| 5,890,316 A * | 4/1999 | Rodgers ................ A01K 83/00 43/43.16 |
| 6,481,149 B1 * | 11/2002 | Hall, IV ................ A01K 83/00 43/43.16 |
| 6,892,490 B2 * | 5/2005 | Mattlage ............... A01K 83/00 43/43.16 |
| 6,910,297 B1 * | 6/2005 | Sitton ................... A01K 83/00 43/43.16 |
| 2005/0167004 A1 | 8/2005 | Kimura et al. |
| 2007/0277906 A1 | 12/2007 | Johns et al. |

FOREIGN PATENT DOCUMENTS

| | | |
|---|---|---|
| EP | 1797967 A1 | 6/2007 |
| EP | 2161080 A1 | 3/2010 |
| EP | 2246384 A1 | 11/2010 |
| JP | H05-031356 A | 2/1993 |
| JP | H06-113699 A | 4/1994 |
| JP | H07-39421 U | 7/1995 |
| JP | 2007-537354 A | 12/2007 |
| JP | 4995467 B2 | 8/2012 |
| JP | 3184119 U | 6/2013 |
| KR | 2014 0091838 A | 7/2014 |
| WO | 03/076064 A1 | 9/2003 |
| WO | 2004091810 A1 | 10/2004 |
| WO | 2006009202 A1 | 1/2006 |
| WO | 2008059840 A1 | 5/2008 |
| WO | 2009104424 A1 | 8/2009 |
| WO | 2014-010219 A1 | 1/2014 |

OTHER PUBLICATIONS

Mar. 16, 2018 Extended Search Report issued in European Patent Application No. 15838925.4.
Jan. 16, 2019 Office Action issued in Korean Patent Application No. 519980609401.

* cited by examiner

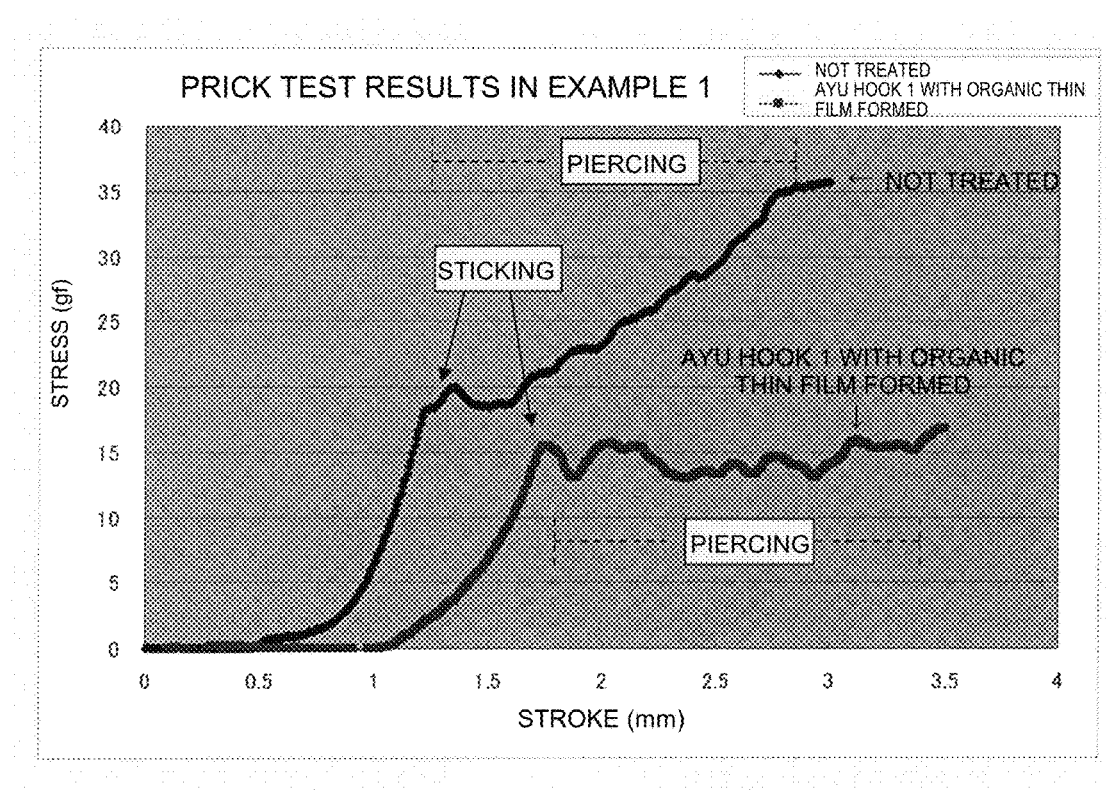

FISHHOOK

TECHNICAL FIELD

The present invention relates to a fishhook for fishing or the like, subjected to a surface treatment, and particularly relates to a fishhook for fishing or the like, subjected to a surface treatment with a metallic surfactant or the like.

The present application claims the priority to Japanese Patent Application No. 2014-180793 filed on Sep. 5, 2014, the content of which is herein incorporated.

BACKGROUND ART

A conventional surface treatment of a fishhook for fishing or the like has been nickel-plating or gold-plating of the surface of a fishhook material, or coating of the surface of the plating layer with an acrylic resin, a urethane resin or the like for enhancement in corrosion resistance.

Furthermore, there has also been proposed formation of a plating layer onto the surface of a fishhook material, the plating layer being combined with a fluororesin of a fine molecular structure on a nickel-phosphorus alloy base material by an electroless treatment (Patent Document 1).

Such a conventional surface treatment, however, has been unable to be conducted while sharpness of a hook tip being kept, and has not been sufficient as a surface treatment of a fishhook for fishing.

In addition, a conventional fishhook coated with Teflon (registered trademark) by plating has been low in impact resistance, and has also been problematic in terms of peeling or lacking of Teflon (registered trademark) plating when subjected to impact with a stone or the like.

On the other hand, as a method for forming a thin film by treating a substrate surface, a method is known where a solution obtained by treating a metallic surfactant having at least one or more hydrolyzable groups with a metal oxide and/or a partial hydrolysis product of a metal alkoxide, and water, in an organic solvent is brought into contact with a substrate surface (Patent Documents 2 and 3, and the like). In addition, other fluorine-based surface treating agent, thiol, sulfide, disulfide or the like is also known as a surface treating agent of a substrate, but any application example thereof to a fishhook or an article similar thereto is not found. Patent Document 3 exemplifies an application of a chemical adsorption film, and exemplifies, as a needle, an acupuncture needle, a sewing needle, a sewing-machine needle, a tatami mat needle, an injection needle, a needle for surgery, a safety pin, or the like, but all of such needles are completely different from a fishhook for fishing or the like for use in water.

PRIOR ART DOCUMENTS

Patent Documents

Patent Document 1: Japanese unexamined Patent Application Publication No. 6-113699

Patent Document 2: International Publication No. WO03/076064

Patent Document 3: Japanese unexamined Patent Application Publication No. 5-31356

SUMMARY OF THE INVENTION

Object to be Solved by the Invention

An object of the present invention is to provide a fishhook for fishing or the like, the fishhook being easily stuck to a fish or the like and being also excellent in durability.

Means to Solve the Object

The present inventors have made intensive studies in order to solve the above problem, and as a result, have found that a surface treatment with a compound selected from the group consisting of a metallic surfactant having at least one or more hydroxyl groups or hydrolyzable groups, a fluorine-based surface treating agent, a thiol compound and a disulfide compound may reduce stresses in sticking and piercing to a fish or the like and also enhances durability, leading to completion of the present invention.

That is, the present invention relates to:

(1) a fishhook subjected to a surface treatment with a compound selected from the group consisting of a metallic surfactant having at least one or more hydroxyl groups or hydrolyzable groups, a fluorine-based surface treating agent, a thiol compound and a disulfide compound;

(2) the fishhook according to (1), wherein the metallic surfactant having at least one or more hydroxyl groups or hydrolyzable groups is a compound represented by formula (I):

$$R^1{}_n MX_{m-n} \qquad (I)$$

(wherein $R^1$ represents a hydrocarbon group having 1 to 30 carbon atoms and optionally having a substituent, a halogenated hydrocarbon group having 1 to 30 carbon atoms and optionally having a substituent, a linking group-containing hydrocarbon group having 1 to 30 carbon atoms, or a linking group-containing halogenated hydrocarbon group having 1 to 30 carbon atoms, M represents at least one metal atom selected from the group consisting of a silicon atom, a germanium atom, a tin atom, a titanium atom and a zirconium atom, X represents a hydroxyl group or a hydrolyzable group, and m represents an atomic valence of M; n represents any positive integer of 1 to (m-1), and when n is 2 or more, each $R^1$ is the same or different; and when (m-n) is 2 or more, each X is the same or different, provided that at least one of X represents a hydroxyl group or a hydrolyzable group); and (3) the fishhook according to (1) or (2), wherein the fishhook is a fishhook preliminarily subjected to a surface treatment with a thin film-forming composition containing:

(a) an epoxy group-containing trialkoxysilane hydrolysis condensate;

(b) an alcohol having 1 to 5 carbon atoms, and/or an organic acid whose pKa at 25° C. is in the range of 2.0 to 6.0; and (c) a polyamine.

Effect of the Invention

The fishhook of the present invention, on which an organic thin film is formed, may allow stresses in sticking and piercing to a fish or the like to be reduced, and therefore may allow a fishing effect to be enhanced and allow the effect to remain even when repeatedly used.

BRIEF DESCRIPTION OF DRAWING

FIG. 1 is a graph representing the prick test results about an ayu hook obtained in Example 1.

MODE OF CARRYING OUT THE INVENTION (1) Surface Treating Compound of Fishhook

The fishhook according to the present invention is subjected to a surface treatment with a compound selected from the group consisting of a metallic surfactant having at least one or more hydroxyl groups or hydrolyzable groups, a fluorine-based surface treating agent, a thiol compound and a disulfide compound. Such a surface treatment allows an organic thin film to be formed on the surface of the fishhook.

Hereinafter, respective surface treating compounds will be described in detail.

1) Metallic Surfactant Having at Least One or More Hydroxyl Groups or Hydrolyzable Groups The "metallic surfactant having at least one or more hydroxyl groups or hydrolyzable groups" in the present invention is not particularly limited as long as it simultaneously has at least one or more hydroxyl groups or hydrolyzable functional groups and a hydrophobic group in the same molecule, but is preferably one having a hydrolyzable group which may react with active hydrogen on the surface of the fishhook to thereby form a bond. Herein, a hydroxyl group, in particular, a hydroxyl group directly bound to a metal atom may react with active hydrogen to thereby form a bond.

As the metallic surfactant having at least one or more hydroxyl groups or hydrolyzable groups, specifically, a compound represented by formula (I):

$$R^1{}_n MX_{m-n} \qquad (I)$$

may be preferably exemplified.

In the formula, $R^1$ represents a hydrocarbon group having 1 to 30 carbon atoms and optionally having a substituent, preferably 10 to 30 carbon atoms, a halogenated hydrocarbon group having 1 to 30 carbon atoms, preferably 10 to 30 carbon atoms and optionally having a substituent, a linking group-containing hydrocarbon group having 1 to 30 carbon atoms, preferably 10 to 30 carbon atoms, or a linking group-containing halogenated hydrocarbon group having 1 to 30 carbon atoms, preferably 10 to 30 carbon atoms, M represents at least one metal atom selected from the group consisting of a silicon atom, a germanium atom, a tin atom, a titanium atom and a zirconium atom, X represents a hydroxyl group or a hydrolyzable group, and m represents the atomic valence of M. n represents any positive integer of 1 to (m-1), and when n is 2 or more, each $R^1$ is the same or different. When (m-n) is 2 or more, each X is the same or different, provided that at least one of X represents a hydroxyl group or a hydrolyzable group.

Examples of the hydrocarbon group of the "hydrocarbon group having 1 to 30 carbon atoms and optionally having a substituent" include an alkyl group having 1 to 30 carbon atoms, such as a methyl group, an ethyl group, a n-propyl group, an isopropyl group, a n-butyl group, an isobutyl group, a sec-butyl group, a t-butyl group, a n-pentyl group, an isopentyl group, a neopentyl group, a t-pentyl group, a n-hexyl group, an isohexyl group, a n-heptyl group, a n-octyl group and a n-decyl group; an alkenyl group having 2 to 30 carbon atoms, such as a vinyl group, an allyl group and a propenyl group; and an aryl group such as phenyl group and a naphthyl group.

Examples of the halogenated hydrocarbon group of the "halogenated hydrocarbon group having 1 to 30 carbon atoms and optionally having a substituent" include an alkyl halide having 1 to 30 carbon atoms, an alkenyl halide having 1 to 30 carbon atoms, and an aryl halide. Examples of the halogen atom include a fluorine atom, a chlorine atom and a bromine atom, and a fluorine atom is preferable. Specifically, examples include a group where one or more hydrogen atoms in any hydrocarbon group exemplified above are each substituted by a halogen atom such as a fluorine atom, a chlorine atom or a bromine atom.

Among them, as the halogenated hydrocarbon group having 1 to 30 carbon atoms, preferable is a group where two or more hydrogen atoms in an alkyl group having 1 to 30 carbon atoms are each substituted by a halogen atom, and more preferable is an alkyl fluoride group where two or more hydrogen atoms in an alkyl group having 1 to 30 carbon atoms are each substituted by a fluorine atom. If the alkyl fluoride group has a branched structure, such a branched portion is preferably a short chain having 1 to 4 carbon atoms, preferably 1 to 2 carbon atoms.

As the alkyl fluoride group, preferable is a group made by a combination of one or more fluorine atoms with a terminal carbon atom, and more preferable is a group having a $CF_3$ group portion made by a combination of three fluorine atoms with a terminal carbon atom. Any carbon chain may be adopted which is terminated by a hydrocarbon group substituted by no fluorine atom and which has an internal carbon chain substituted by a fluorine atom. Particularly preferable is a group which is terminated by a perfluoroalkyl portion where all hydrogen atoms in the alkyl group are each substituted by a fluorine atom and which is provided with an alkylene group represented by $-(CH_2)_h-$ (wherein h represents an integer of 1 to 6, preferably an integer of 2 to 4.) between the relevant group and a metal atom M described later.

The number of fluorine atoms in the alkyl fluoride group is preferably 60% or more and more preferably 80% or more when it is expressed by [(Number of fluorine atoms in alkyl fluoride group)/(Number of hydrogen atoms present in corresponding alkyl group having the same number of carbon atoms as alkyl fluoride group)×100]%.

Examples of the substituent with respect to the "hydrocarbon group having 1 to 30 carbon atoms and optionally having a substituent" or the "halogenated hydrocarbon group having 1 to 30 carbon atoms and optionally having a substituent" include a carboxyl group; an amide group; an imide group; an alkoxycarbonyl group; an alkoxy group such as a methoxy group and an ethoxy group; and a hydroxyl group. The number of such substituents is preferably 0 to 3.

The hydrocarbon group of the "linking group-containing hydrocarbon group having 1 to 30 carbon atoms" specifically includes the same groups as those exemplified with respect to the hydrocarbon group of the "hydrocarbon group having 1 to 30 carbon atoms and optionally having a substituent".

In addition, the halogenated hydrocarbon group of the "linking group-containing halogenated hydrocarbon group having 1 to 30 carbon atoms" specifically includes the same groups as those exemplified with respect to the halogenated hydrocarbon group of the "halogenated hydrocarbon group having 1 to 30 carbon atoms and optionally having a substituent".

The linking group is preferably present between carbon atoms to be bound in the hydrocarbon group or the halogenated hydrocarbon group, or between carbon of the hydrocarbon group and a metal atom M described later.

Specific examples of the linking group include —O—, —S—, —SO$_2$—, —CO—, —C(=O)O— or —C(=O) NR$^{51}$— (wherein R$^{51}$ represents a hydrogen atom; or an alkyl group such as a methyl group, an ethyl group, a n-propyl group or an isopropyl group.).

In particular, R$^1$ preferably represents an alkyl group having 1 to 30 carbon atoms, an alkyl fluoride group having 1 to 30 carbon atoms, or a linking group-containing alkyl fluoride group in terms of water repellency and durability.

Specific more preferable examples of R$^1$ include CH$_3$—, CH$_3$CH$_2$—, (CH$_3$)$_2$CH—, (CH$_3$)$_3$C—, CH$_3$(CH$_2$)$_2$—, CH$_3$(CH$_2$)$_3$—, CH$_3$(CH$_2$)$_4$—, CH$_3$(CH$_2$)$_5$—, CH$_3$(CH$_2$)$_6$—, CH$_3$(CH$_2$)$_7$—, CH$_3$(CH$_2$)$_8$—, CH$_3$(CH$_2$)$_9$—, CH$_3$(CH$_2$)$_{10}$—, CH$_3$(CH$_2$)$_{11}$—, CH$_3$(CH$_2$)$_{12}$—, CH$_3$(CH$_2$)$_{13}$—, CH$_3$(CH$_2$)$_{14}$—, CH$_3$(CH$_2$)$_{15}$—, CH$_3$(CH$_2$)$_{16}$—, CH$_3$(CH$_2$)$_{17}$—, CH$_3$(CH$_2$)$_{18}$—, CH$_3$(CH$_2$)$_{19}$—, CH$_3$(CH$_2$)$_{20}$—, CH$_3$(CH$_2$)$_{21}$—, CH$_3$(CH$_2$)$_{22}$—, CH$_3$(CH$_2$)$_{23}$—, CH$_3$(CH$_2$)$_{24}$—, CH$_3$(CH$_2$)$_{25}$—, CF$_3$—, CF$_3$CF$_2$—, (CF$_3$)$_2$CF—, (CF$_3$)$_3$C—, CF$_3$(CH$_2$)$_2$—, CF$_3$(CF$_2$)$_3$(CH$_2$)$_2$—, CF$_3$(CF$_2$)$_5$(CH$_2$)$_2$—, CF$_3$(CF$_2$)$_7$(CH$_2$)$_2$—, CF$_3$(CF$_2$)$_3$(CH$_2$)$_3$—, CF$_3$(CF$_2$)$_5$(CH$_2$)$_3$—, CF$_3$(CF$_2$)$_7$(CH$_2$)$_3$—, CF$_3$(CF$_2$)$_9$(CH$_2$)$_2$—, CF$_3$(CF$_2$)$_6$(CH$_2$)$_2$—, CF$_3$(CF$_2$)$_4$O(CF$_2$)$_2$(CH$_2$)$_2$—, CF$_3$(CF$_2$)$_4$O(CF$_2$)$_2$(CH$_2$)$_3$—, CF$_3$(CF$_2$)$_7$O(CF$_2$)$_2$(CH$_2$)$_2$—, CF$_3$(CF$_2$)$_7$CONH(CH$_2$)$_2$—, CF$_3$(CF$_2$)$_7$CONH(CH$_2$)$_3$—, CF$_3$(CF$_2$)$_3$O[CF(CF$_3$)CF(CF$_3$)O]$_2$CF(CF$_3$)CONH(CH$_2$)$_3$—, CH$_3$(CF$_2$)$_7$(CH$_2$)$_2$—, CH$_3$(CF$_2$)$_8$(CH$_2$)$_2$—, CH$_3$(CF$_2$)$_9$(CH$_2$)$_2$—, CH$_3$(CF$_2$)$_{10}$(CH$_2$)$_2$—, CH$_3$(CF$_2$)$_{11}$(CH$_2$)$_2$—, CH$_3$(CF$_2$)$_{12}$(CH$_2$)$_2$—, CH$_3$(CF$_2$)$_7$(CH$_2$)$_3$—, CH$_3$(CF$_2$)$_9$(CH$_2$)$_3$—, CH$_3$(CF$_2$)$_{11}$(CH$_2$)$_3$—, CH$_3$CH$_2$(CF$_2$)$_6$(CH$_2$)$_2$—, CH$_3$CH$_2$(CF$_2$)$_8$(CH$_2$)$_2$—, CH$_3$CH$_2$(CF$_2$)$_{10}$(CH$_2$)$_2$—, CH$_3$(CF$_2$)$_4$O(CF$_2$)$_2$(CH$_2$)$_2$—, CH$_3$(CF$_2$)$_7$(CH$_2$)$_2$O(CH$_2$)$_3$—, CH$_3$(CF$_2$)$_8$(CH$_2$)$_2$O(CH$_2$)$_3$—, CH$_3$(CF$_2$)$_9$(CH$_2$)$_2$O(CH$_2$)$_3$—, CH$_3$CH$_2$(CF$_2$)$_6$(CH$_2$)$_2$O(CH$_2$)$_3$—, CH$_3$(CF$_2$)$_6$CONH(CH$_2$)$_3$—, CH$_3$(CF$_2$)$_8$CONH(CH$_2$)$_3$—, and CH$_3$(CF$_2$)$_3$O[CF(CF$_3$)CF(CF$_3$)O]$_2$CF(CF$_3$)CONH(CH$_2$)$_3$—, but not limited thereto.

M represents one atom selected from the group consisting of a silicon atom, a germanium atom, a tin atom, a titanium atom and a zirconium atom. Among them, a silicon atom is particularly preferable in terms of availability, reactivity or the like of a raw material.

X represents a hydroxyl group or a hydrolyzable group, and such a hydrolyzable group is not particularly limited as long as it is a group which is decomposed by a reaction with water. Specifically, an alkoxy group having 1 to 6 carbon atoms and optionally having a substituent; a hydrocarbon-oxy group (except for an alkoxy group) optionally having a substituent; an acyloxy group optionally having a substituent; a halogen atom such as a fluorine atom, a chlorine atom, a bromine atom or an iodine atom; an isocyanate group; a cyano group; an amino group; an amide group or the like may be exemplified.

Examples of the "alkoxy group having 1 to 6 carbon atoms" include a methoxy group, an ethoxy group, a n-propoxy group, an isopropoxy group, a n-butoxy group, a sec-butoxy group, a t-butoxy group, a n-pentyloxy group, and a n-hexyloxy group.

Examples of the "hydrocarbonoxy group" except for an alkoxy group include an alicyclic hydrocarbonoxy group such as a cyclopropyloxy group, cyclopropylmethyloxy, and a cyclohexyloxy group; an alkenyloxy group such as a vinyloxy group, an allyloxy group, and a norbornyloxy group; an alkynyloxy group such as a propargyloxy group; an aryloxy group such as a phenoxy group and a naphthyloxy group; and an arylalkyloxy group such as a benzyloxy group and a phenethyloxy group.

Examples of the acyloxy group include an alkylcarbonyloxy group such as an acetoxy group and a propionyloxy group; an alkenylcarbonyloxy group such as a (meth)acryloyloxy group; and an arylcarbonyloxy group such as a benzoyloxy group.

Examples of the substituent with respect to the "optionally having a substituent" in X include a carboxyl group, an amide group, an imide group, an alkoxycarbonyl group and a hydroxyl group.

X particularly preferably represents a hydroxyl group, a halogen atom, an alkoxy group having 1 to 6 carbon atoms, an acyloxy group, or an isocyanate group, and more preferably represents an alkoxy group having 1 to 4 carbon atoms, or an acyloxy group.

m represents the atomic valence of a metal atom M.

n represents any positive integer of 1 to (m-1). In order to produce a high-density organic thin film, n preferably represents 1. When n is 2 or more, each R$^1$ is the same or different. In addition, when (m-n) is 2 or more, each X is the same or different, provided that at least one of X represents a hydroxyl group or a hydrolyzable group.

As one preferable mode as the compound represented by formula (I), a compound represented by formula (II):

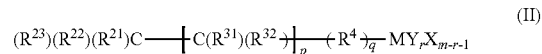

(II)

may be exemplified.

In the formula, M, X and m each represent the same meaning as above. R$^{21}$ to R$^{23}$, R$^{31}$ and R$^{32}$ each independently represent a hydrogen atom or a fluorine atom, and R$^4$ represents an alkylene group, a vinylene group, an ethynylene group, an arylene group, or a divalent linking group including a silicon atom and/or an oxygen atom. Y represents an alkyl group, an alkoxy group, a fluorine-containing alkyl group or a fluorine-containing alkoxy group. p represents 0 or a natural number, and q represents 0 or 1. When p is 2 or more, groups represented by formula: C(R$^{31}$)(R$^{32}$) is the same or different. r represents 0, or any positive integer of 1 to (m-2). When r is 2 or more, each Y is the same or different, and when (m-r-1) is 2 or more, each X is the same or different, provided that at least one of Y and X represents a hydroxyl group or a hydrolyzable group.

In formula (II), specifically, a functional group represented by the following formula may be exemplified as R$^4$.

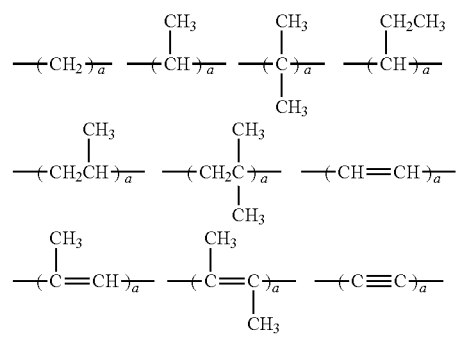

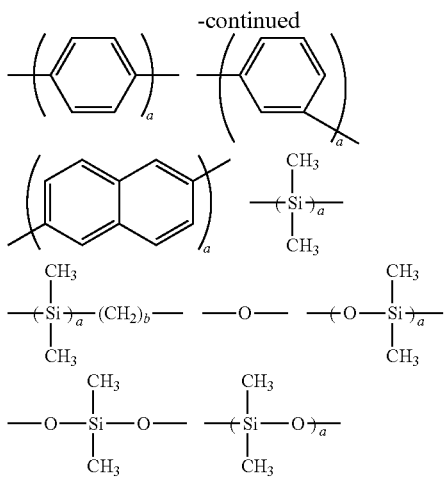

In the above formula, a and b each represent any natural number of 1 or more.

Y represents an alkyl group such as a methyl group, an ethyl group, a n-propyl group, an isopropyl group, a n-butyl group, an isobutyl group, a sec-butyl group, a t-butyl group, a n-pentyl group, an isopentyl group, a neopentyl group, a t-pentyl group, a n-hexyl group or an isohexyl group; an alkoxy group such as a methoxy group, an ethoxy group, a n-propoxy group, an isopropoxy group, a n-butoxy group, a sec-butoxy group, a t-butoxy group, a n-pentyloxy group or a n-hexyloxy group; a fluorine-containing alkyl group where a part or all of hydrogen atoms in an alkyl group are each substituted with a fluorine atom; or a fluorine-containing alkoxy group where a part or all of hydrogen atoms in an alkoxy group are each substituted with a fluorine atom.

While r represents 0, or any positive integer of 1 to (m-2), r preferably represents 0 in order to produce a high-density adsorption film. When r is 2 or more, each Y is the same or different. When (m-r-1) is 2 or more, each X is the same or different, provided that at least one of Y and X represents a hydroxyl group or a hydrolyzable group.

Specific examples of the compound represented by formula (I) include the following. While a compound where the metal atom M represents a silicon atom is shown below as a representative example, the present invention is not limited thereto. In addition, the hydrolyzable group is not limited to any functional group exemplified, and other hydrolyzable group may also be bound.

$CH_3CH_2O(CH_2)_{15}Si(OCH_3)_3$
$CF_3CH_2O(CH_2)_{15}Si(OCH_3)_3$
$CH_3(CH_2)_2Si(CH_3)_2(CH_2)_{15}Si(OCH_3)_3$
$CH_3(CH_2)_6Si(CH_3)_2(CH_2)_9Si(OCH_3)_3$
$CH_3COO(CH_2)_{15}Si(OCH_3)_3$
$CF_3(CF_2)_5(CH_2)_2Si(OCH_3)_3$
$CF_3(CF_2)_7(CH=CH)Si(OCH_3)_3$
$CH_3CH_2O(CH_2)_{15}Si(OC_2H_5)_3$
$CH_3(CH_2)_2Si(CH_3)_2(CH_2)_{15}Si(OC_2H_5)_3$
$CH_3(CH_2)_6Si(CH_3)_2(CH_2)_9Si(OC_2H_5)_3$
$CF_3(CH_2)_6Si(CH_3)_2(CH_2)_9Si(OC_2H_5)_3$
$CH_3COO(CH_2)_{15}Si(OC_2H_5)_3$
$CF_3COO(CH_2)_{15}Si(OC_2H_5)_3$
$CF_3COO(CH_2)_{15}Si(OCH_3)_3$
$CF_3(CF_2)_9(CH_2)_2Si(OC_2H_5)_3$
$CF_3(CF_2)_7(CH_2)_2Si(OC_2H_5)_3$
$CF_3(CF_2)_5(CH_2)_2Si(OC_2H_5)_3$
$CF_3(CF_2)_7(CH=CH)_3Si(OC_2H_5)_3$
$CF_3(CF_2)_9(CH_2)_2Si(OCH_3)_3$
$CF_3(CF_2)_5(CH_2)_2Si(OCH_3)_3$
$CF_3(CF_2)_7(CH_2)_2Si(CH_3)(OC_2H_5)_2$
$CF_3(CF_2)_7(CH_2)_2Si(CH_3)(OCH_3)_2$
$CF_3(CF_2)_7(CH_2)_2Si(CH_3)_2(OC_2H_5)$
$CF_3(CF_2)_7(CH_2)_2Si(CH_3)_2(OCH_3)$
$CF_3(CH_2)_2Si(OCH_3)_3$
$CF_3(CF_2)_3(CH_2)_2Si(OCH_3)_3$
$CF_3(CF_2)_5(CH_2)_2Si(OCH_3)_3$
$CF_3(CF_2)_7(CH_2)_2Si(OCH_3)_3$
$CF_3(CF_2)_3(CH_2)_3Si(OCH_3)_3$
$CF_3(CF_2)_5(CH_2)_3Si(OCH_3)_3$
$CF_3(CF_2)_7(CH_2)_3Si(OCH_3)_3$
$CF_3(CF_2)_4O(CF_2)_2(CH_2)_2Si(OCH_3)_3$
$CF_3(CF_2)_4O(CF_2)_2(CH_2)_3Si(OCH_3)_3$
$CF_3(CF_2)_7(CH_2)_2O(CH_2)_3Si(OCH_3)_3$
$CF_3(CF_2)_7CONH(CH_2)_2Si(OCH_3)_3$
$CF_3(CF_2)_7CONH(CH_2)_3Si(OCH_3)_3$
$CF_3(CF_2)_3[CF(CF_3)CF(CF_3)O]_2CF(CF_3)$—$CONH(CH_2)_3Si(OCH_3)_3$
$CF_3(CF_2)_3(CH_2)_2Si(CH_3)(OCH_3)_2$
$CF_3(CF_2)_5(CH_2)_2Si(CH_3)(OCH_3)_2$
$CF_3(CH_2)_2Si(CH_3)(OCH_3)_2$
$CF_3(CF_2)_3(CH_2)_3Si(CH_3)(OCH_3)_2$
$CF_3(CF_2)_5(CH_2)_3Si(CH_3)(OCH_3)_2$
$CF_3(CF_2)_7(CH_2)_3Si(CH_3)(OCH_3)_2$
$CF_3(CF_2)_4(CF_2)_2(CH_2)_2Si(CH_3)(OCH_3)_2$
$CF_3(CF_2)_4(CF_2)_2(CH_2)_3Si(CH_3)(OCH_3)_2$
$CF_3(CF_2)_4(CH_2)_2O(CH_2)_3Si(CH_3)(OCH_3)_2$
$CF_3(CF_2)_7CONH(CH_2)_2Si(CH_3)(OCH_3)_2$
$CF_3(CF_2)_7CONH(CH_2)_3Si(CH_3)(OCH_3)_2$
$CF_3(CF_2)_3O[CF(CF_3)CF(CF_3)O]_2CF(CF_3)$—$CONH(CH_2)_3Si(CH_3)(OCH_3)_2$
$CH_3(CH_2)_7Si(OCH_3)_3$
$CH_3(CF_2)_7(CH_2)_2Si(OCH_3)_3$
$CH_3(CF_2)_7(CH_2)_2Si(CH_3)(OCH_3)_2$
$CH_3(CF_2)_7(CH_2)_2Si(OCH_3)_3$
$CH_3(CF_2)_7(CH_2)_2Si(NCO)_3$
$CH_3(CF_2)_8(CH_2)_2Si(OCH_3)_3$
$CH_3(CF_2)_8(CH_2)_2Si(NCO)_3$
$CH_3(CF_2)_9(CH_2)_2Si(OCH_3)_3$
$CH_3(CF_2)_9(CH_2)_2Si(NCO)_3$
$CH_3CH_2(CF_2)_6(CH_2)_2Si(OCH_3)_3$
$CH_3CH_2(CF_2)_6(CH_2)_2Si(NCO)_3$
$CH_3CH_2(CF_2)_8(CH_2)_2Si(OCH_3)_3$
$CH_3CH_2(CF_2)_8(CH_2)_2Si(NCO)_3$
$CH_3CH_2(CF_2)_{10}(CH_2)_2Si(OCH_3)_3$
$CH_3(CF_2)_4O(CF_2)_2(CH_2)_2Si(OCH_3)_3$
$CH_3(CF_2)_7(CH_2)_2O(CH_2)_3Si(OCH_3)_3$
$CH_3(CF_2)_8(CH_2)_2O(CH_2)_3Si(OCH_3)_3$
$CH_3(CF_2)_9(CH_2)_2O(CH_2)_3Si(OCH_3)_3$
$CH_3CH_2(CF_2)_6(CH_2)_2O(CH_2)_3Si(OCH_3)_3$
$CH_3(CF_2)_6CONH(CH_2)_3Si(OCH_3)_3$
$CH_3(CF_2)_8CONH(CH_2)_3Si(OCH_3)_3$
$CH_3(CF_2)_3O[CF(CF_3)CF(CF_3)O]_2CF(CF_3)$—$CONH(CH_2)_3Si(OCH_3)_3$
$CH_3CH_2O(CH_2)_{15}Si(OCH_3)(OH)_2$
$CF_3CH_2O(CH_2)_{15}Si(OCH_3)(OH)_2$
$CH_3(CH_2)_2Si(CH_3)_2(CH_2)_{15}Si(OCH_3)(OH)_2$
$CH_3(CH_2)_6Si(CH_3)_2(CH_2)_9Si(OCH_3)(OH)_2$
$CH_3COO(CH_2)_{15}Si(OCH_3)(OH)_2$
$CF_3(CF_2)_5(CH_2)_2Si(OCH_3)(OH)_2$
$CF_3(CF_2)_7(CH=CH)_3Si(OCH_3)(OH)_2$
$CH_3CH_2O(CH_2)_{15}Si(OC_2H_5)(OH)_2$
$CH_3(CH_2)_2Si(CH_3)_2(CH_2)_{15}Si(OC_2H_5)(OH)_2$
$CH_3(CH_2)_6Si(CH_3)_2(CH_2)_9Si(OC_2H_5)(OH)_2$
$CF_3(CH_2)_6Si(CH_3)_2(CH_2)_9Si(OC_2H_5)(OH)_2$
$CH_3COO(CH_2)_{15}Si(OC_2H_5)(OH)_2$

CF$_3$COO(CH$_2$)$_{15}$Si(OC$_2$H$_5$)(OH)$_2$
CF$_3$COO(CH$_2$)$_{15}$Si(OCH$_3$)(OH)$_2$
CF$_3$(CF$_2$)$_9$(CH$_2$)$_2$Si(OC$_2$H$_5$)(OH)$_2$
CF$_3$(CF$_2$)$_7$(CH$_2$)$_2$Si(OC$_2$H$_5$)(OH)$_2$
CF$_3$(CF$_2$)$_5$(CH$_2$)$_2$Si(OC$_2$H$_5$)(OH)$_2$
CF$_3$(CF$_2$)$_7$(CH=CH)$_3$Si(OC$_2$H$_5$)(OH)$_2$
CF$_3$(CF$_2$)$_9$(CH$_2$)$_2$Si(OCH$_3$)(OH)$_2$
CF$_3$(CF$_2$)$_5$(CH$_2$)$_2$Si(OCH$_3$)(OH)$_2$
CF$_3$(CF$_2$)$_7$(CH$_2$)$_2$Si(CH$_3$)(OH)$_2$
CF$_3$(CF$_2$)$_9$(CH$_2$)$_2$Si(CH$_3$)(OH)$_2$
CH$_3$CH$_2$O(CH$_2$)$_{15}$Si(OCH$_3$)$_2$(OH)
CF$_3$CH$_2$O(CH$_2$)$_{15}$Si(OCH$_3$)$_2$(OH)
CH$_3$(CH$_2$)$_2$Si(CH$_3$)$_2$(CH$_2$)$_{15}$Si(OCH$_3$)$_2$(OH)
CH$_3$(CH$_2$)$_6$Si(CH$_3$)$_2$(CH$_2$)$_9$Si(OCH$_3$)$_2$(OH)
CH$_3$COO(CH$_2$)$_{15}$Si(OCH$_3$)$_2$(OH)
CF$_3$(CF$_2$)$_5$(CH$_2$)$_2$Si(OCH$_3$)$_2$(OH)
CH$_3$CH$_2$O(CH$_2$)$_{15}$Si(OC$_2$H$_5$)$_2$(OH)
CF$_3$(CF$_2$)$_7$(CH=CH)$_3$Si(OCH$_3$)$_2$(OH)
CH$_3$(CH$_2$)$_2$Si(CH$_3$)$_2$(CH$_2$)$_{15}$Si(OC$_2$H$_5$)$_2$(OH)
CH$_3$(CH$_2$)$_6$Si(CH$_3$)$_2$(CH$_2$)$_9$Si(OC$_2$H$_5$)$_2$(OH)
CF$_3$(CH$_2$)$_6$Si(CH$_3$)$_2$(CH$_2$)$_9$Si(OC$_2$H$_5$)$_2$(OH)
CH$_3$COO(CH$_2$)$_{15}$Si(OC$_2$H$_5$)$_2$(OH)
CF$_3$COO(CH$_2$)$_{15}$Si(OC$_2$H$_5$)$_2$(OH)
CF$_3$COO(CH$_2$)$_{15}$Si(OCH$_3$)$_2$(OH)
CF$_3$(CF$_2$)$_9$(CH$_2$)$_2$Si(OC$_2$H$_5$)$_2$(OH)
CF$_3$(CF$_2$)$_7$(CH$_2$)$_2$Si(OC$_2$H$_5$)$_2$(OH)
CF$_3$(CF$_2$)$_5$(CH$_2$)$_2$Si(OC$_2$H$_5$)$_2$(OH)
CF$_3$(CF$_2$)$_7$(CH=CH)$_3$Si(OC$_2$H$_5$)$_2$(OH)
CF$_3$(CF$_2$)$_9$(CH$_2$)$_2$Si(OCH$_3$)$_2$(OH)
CF$_3$(CF$_2$)$_5$(CH$_2$)$_2$Si(OCH$_3$)$_2$(OH)
CF$_3$(CF$_2$)$_7$(CH$_2$)$_2$Si(CH$_3$)(OC$_2$H$_5$)(OH)
CF$_3$(CF$_2$)$_7$(CH$_2$)$_2$Si(CH$_3$)(OCH$_3$)(OH)
CF$_3$(CH$_2$)$_2$Si(OCH$_3$)(OH)$_2$
CF$_3$(CF$_2$)$_3$(CH$_2$)$_2$Si(OCH$_3$)(OH)$_2$
CF$_3$(CF$_2$)$_5$(CH$_2$)$_2$Si(OCH$_3$)(OH)$_2$
CF$_3$(CF$_2$)$_7$(CH$_2$)$_2$Si(OCH$_3$)(OH)$_2$
CF$_3$(CF$_2$)$_3$(CH$_2$)$_3$Si(OCH$_3$)(OH)$_2$
CF$_3$(CF$_2$)$_5$(CH$_2$)$_3$Si(OCH$_3$)(OH)$_2$
CF$_3$(CF$_2$)$_7$(CH$_2$)$_3$Si(OCH$_3$)(OH)$_2$
CF$_3$(CF$_2$)$_4$O(CF$_2$)$_2$(CH$_2$)$_2$Si(OCH$_3$)(OH)$_2$
CF$_3$(CF$_2$)$_4$O(CF$_2$)$_2$(CH$_2$)$_3$Si(OCH$_3$)(OH)$_2$
CF$_3$(CF$_2$)$_7$(CH$_2$)$_2$O(CH$_2$)$_3$Si(OCH$_3$)(OH)$_2$
CF$_3$(CF$_2$)$_7$CONH(CH$_2$)$_2$Si(OCH$_3$)(OH)$_2$
CF$_3$(CF$_2$)$_7$CONH(CH$_2$)$_3$Si(OCH$_3$)(OH)$_2$
CF$_3$(CF$_2$)$_3$O[CF(CF$_3$)CF(CF$_3$)O]$_2$CF(CF$_3$)CONH(CH$_2$)$_3$Si(OCH$_3$)(OH)$_2$
CF$_3$(CH$_2$)$_2$Si(OCH$_3$)$_2$(OH)
CF$_3$(CF$_2$)$_3$(CH$_2$)$_2$Si(OCH$_3$)$_2$(OH)
CF$_3$(CF$_2$)$_5$(CH$_2$)$_2$Si(OCH$_3$)$_2$(OH)
CF$_3$(CF$_2$)$_7$(CH$_2$)$_2$Si(OCH$_3$)$_2$(OH)
CF$_3$(CF$_2$)$_3$(CH$_2$)$_3$Si(OCH$_3$)$_2$(OH)
CF$_3$(CF$_2$)$_5$(CH$_2$)$_3$Si(OCH$_3$)$_2$(OH)
CF$_3$(CF$_2$)$_7$(CH$_2$)$_3$Si(OCH$_3$)$_2$(OH)
CF$_3$(CF$_2$)$_4$O(CF$_2$)$_2$(CH$_2$)$_2$Si(OCH$_3$)$_2$(OH)
CF$_3$(CF$_2$)$_4$O(CF$_2$)$_2$(CH$_2$)$_3$Si(OCH$_3$)$_2$(OH)
CF$_3$(CF$_2$)$_7$(CH$_2$)$_2$O(CH$_2$)$_3$Si(OCH$_3$)$_2$(OH)
CF$_3$(CF$_2$)$_7$CONH(CH$_2$)$_2$Si(OCH$_3$)$_2$(OH)
CF$_3$(CF$_2$)$_7$CONH(CH$_2$)$_3$Si(OCH$_3$)$_2$(OH)
CF$_3$(CF$_2$)$_3$O[CF(CF$_3$)CF(CF$_3$)O]$_2$CF(CF$_3$)CONH(CH$_2$)$_3$Si(OCH$_3$)$_2$(OH)
CH$_3$(CH$_2$)$_7$Si(OCH$_3$)(OH)$_2$
CH$_3$(CF$_2$)$_7$(CH$_2$)$_2$Si(OCH$_3$)(OH)$_2$
CH$_3$(CF$_2$)$_7$(CH$_2$)$_2$Si(NCO)(OH)$_2$
CH$_3$(CF$_2$)$_8$(CH$_2$)$_2$Si(OCH$_3$)(OH)$_2$
CH$_3$(CF$_2$)$_8$(CH$_2$)$_2$Si(NCO)(OH)$_2$
CH$_3$(CF$_2$)$_9$(CH$_2$)$_2$Si(OCH$_3$)(OH)$_2$
CH$_3$(CF$_2$)$_9$(CH$_2$)$_2$Si(NCO)(OH)$_2$
CH$_3$CH$_2$(CF$_2$)$_6$(CH$_2$)$_2$Si(OCH$_3$)(OH)$_2$
CH$_3$CH$_2$(CF$_2$)$_6$(CH$_2$)$_2$Si(OCH$_3$)(OH)$_2$
CH$_3$CH$_2$(CF$_2$)$_6$(CH$_2$)$_2$Si(NCO)(OH)$_2$
CH$_3$CH$_2$(CF$_2$)$_8$(CH$_2$)$_2$Si(OCH$_3$)(OH)$_2$
CH$_3$CH$_2$(CF$_2$)$_8$(CH$_2$)$_2$Si(NCO)(OH)$_2$
CH$_3$CH$_2$(CF$_2$)$_{10}$(CH$_2$)$_2$Si(OCH$_3$)(OH)$_2$
CH$_3$(CF$_2$)$_4$O(CF$_2$)$_2$(CH$_2$)$_2$Si(OCH$_3$)(OH)$_2$
CH$_3$(CF$_2$)$_7$(CH$_2$)$_2$O(CH$_2$)$_3$Si(OCH$_3$)(OH)$_2$
CH$_3$(CF$_2$)$_8$(CH$_2$)$_2$O(CH$_2$)$_3$Si(OCH$_3$)(OH)$_2$
CH$_3$(CF$_2$)$_9$(CH$_2$)$_2$O(CH$_2$)$_3$Si(OCH$_3$)(OH)$_2$
CH$_3$CH$_2$(CF$_2$)$_6$(CH$_2$)$_2$O(CH$_2$)$_3$Si(OCH$_3$)(OH)$_2$
CH$_3$(CF$_2$)$_6$CONH(CH$_2$)$_3$Si(OCH$_3$)(OH)$_2$
CH$_3$(CF$_2$)$_8$CONH(CH$_2$)$_3$Si(OCH$_3$)(OH)$_2$
CH$_3$(CF$_2$)$_3$O[CF(CF$_3$)CF(CF$_3$)O]$_2$CF(CF$_3$)CONH(CH$_2$)$_3$Si(OCH$_3$)(OH)$_2$
CF$_3$(CF$_2$)$_3$(CH$_2$)$_2$Si(OH$_3$)(OCH$_3$)(OH)
CF$_3$(CF$_2$)$_5$(CH$_2$)$_2$Si(CH$_3$)(OCH$_3$)(OH)
CF$_3$(CH$_2$)$_2$Si(CH$_3$)(OCH$_3$)(OH)
CF$_3$(CF$_2$)$_3$(CH$_2$)$_3$Si(CH$_3$)(OCH$_3$)(OH)
CF$_3$(CF$_2$)$_5$(CH$_2$)$_3$Si(CH$_3$)(OCH$_3$)(OH)
CF$_3$(CF$_2$)$_7$(CH$_2$)$_3$Si(CH$_3$)(OCH$_3$)(OH)
CF$_3$(CF$_2$)$_4$(CF$_2$)$_2$(CH$_2$)$_2$Si(CH$_3$)(OCH$_3$)(OH)
CF$_3$(CF$_2$)$_4$(CF$_2$)$_2$(CH$_2$)$_3$Si(CH$_3$)(OCH$_3$)(OH)
CF$_3$(CF$_2$)$_4$(CF$_2$)$_2$O(CH$_2$)$_3$Si(CH$_3$)(OCH$_3$)(OH)
CF$_3$(CF$_2$)$_7$CONH(CH$_2$)$_2$Si(CH$_3$)(OCH$_3$)(OH)
CF$_3$(CF$_2$)$_7$CONH(CH$_2$)$_3$Si(CH$_3$)(OCH$_3$)(OH)
CF$_3$(CF$_2$)$_3$O[CF(CF$_3$)CF(CF$_3$)O]$_2$CF(CF$_3$)CONH(CH$_2$)$_3$Si(CH$_3$)(OCH$_3$)(OH)
CH$_3$(CH$_2$)$_7$Si(OCH$_3$)$_2$(OH)
CH$_3$(CF$_2$)$_7$(CH$_2$)$_2$Si(OCH$_3$)$_2$(OH)
CH$_3$(CF$_2$)$_7$(CH$_2$)$_2$Si(CH$_3$)(OCH$_3$)(OH)
CH$_3$(CF$_2$)$_7$(CH$_2$)$_2$Si(NCO)$_2$(OH)
CH$_3$(CF$_2$)$_8$(CH$_2$)$_2$Si(OCH$_3$)$_2$(OH)
CH$_3$(CF$_2$)$_8$(CH$_2$)$_2$Si(NCO)$_2$(OH)
CH$_3$(CF$_2$)$_9$(CH$_2$)$_2$Si(OCH$_3$)$_2$(OH)
CH$_3$(CF$_2$)$_9$(CH$_2$)$_2$Si(NCO)$_2$(OH)
CH$_3$CH$_2$(CF$_2$)$_6$(CH$_2$)$_2$Si(OCH$_3$)$_2$(OH)
CH$_3$CH$_2$(CF$_2$)$_6$(CH$_2$)$_2$Si(NCO)$_2$(OH)
CH$_3$CH$_2$(CF$_2$)$_8$(CH$_2$)$_2$Si(OCH$_3$)$_2$(OH)
CH$_3$CH$_2$(CF$_2$)$_8$(CH$_2$)$_2$Si(NCO)$_2$(OH)
CH$_3$CH$_2$(CF$_2$)$_{10}$(CH$_2$)$_2$Si(OCH$_3$)$_2$(OH)
CH$_3$(CF$_2$)$_4$O(CF$_2$)$_2$(CH$_2$)$_2$Si(OCH$_3$)$_2$(OH)
CH$_3$(CF$_2$)$_7$(CH$_2$)$_2$O(CH$_2$)$_3$Si(OCH$_3$)$_2$(OH)
CH$_3$(CF$_2$)$_8$(CH$_2$)$_2$O(CH$_2$)$_3$Si(OCH$_3$)$_2$(OH)
CH$_3$(CF$_2$)$_9$(CH$_2$)$_2$O(CH$_2$)$_3$Si(OCH$_3$)$_2$(OH)
CH$_3$CH$_2$(CF$_2$)$_6$(CH$_2$)$_2$O(CH$_2$)$_3$Si(OCH$_3$)$_2$(OH)
CH$_3$(CF$_2$)$_6$CONH(CH$_2$)$_3$Si(OCH$_3$)$_2$(OH)
CH$_3$(CF$_2$)$_8$CONH(CH$_2$)$_3$Si(OCH$_3$)$_2$(OH)
CH$_3$(CF$_2$)$_3$O[CF(CF$_3$)CF(CF$_3$)O]$_2$CF(CF$_3$)CONH(CH$_2$)$_3$Si(OCH$_3$)$_2$(OH)
CH$_3$CH$_2$O(CH$_2$)$_{15}$Si(OH)$_3$
CF$_3$CH$_2$O(CH$_2$)$_{15}$Si(OH)$_3$
CH$_3$(CH$_2$)$_2$Si(CH$_3$)$_2$(CH$_2$)$_{15}$Si(OH)$_3$
CH$_3$(CH$_2$)$_6$Si(CH$_3$)$_2$(CH$_2$)$_9$Si(OH)$_3$
CH$_3$COO(CH$_2$)$_{15}$Si(OH)$_3$
CF$_3$(CF$_2$)$_5$(CH$_2$)$_2$Si(OH)$_3$
CF$_3$(CF$_2$)$_7$(CH=CH)$_3$Si(OH)$_3$
CH$_3$CH$_2$O(CH$_2$)$_{15}$Si(OH)$_3$
CH$_3$(CH$_2$)$_2$Si(CH$_3$)$_2$(CH$_2$)$_{15}$Si(OH)$_3$
CH$_3$(CH$_2$)$_6$Si(CH$_3$)$_2$(CH$_2$)$_9$Si(OH)$_3$
CF$_3$(CH$_2$)$_6$Si(CH$_3$)$_2$(CH$_2$)$_9$Si(OH)$_3$
CH$_3$COO(CH$_2$)$_{15}$Si(OH)$_3$
CF$_3$COO(CH$_2$)$_{15}$Si(OH)$_3$
CF$_3$(CF$_2$)$_9$(CH$_2$)$_2$Si(OH)$_3$
CF$_3$(CF$_2$)$_7$(CH$_2$)$_2$Si(OH)$_3$
CF$_3$(CF$_2$)$_5$(CH$_2$)$_2$Si(OH)$_3$
CF$_3$(CF$_2$)$_7$(CH=CH)$_3$Si(OH)$_3$ $CF_3(CF_2)_7(CH_2)_2Si(CH_3)_2(OH)$
$CF_3(CH_2)_2Si(OH)_3$
$CF_3(CF_2)_3(CH_2)_2Si(OH)_3$
$CF_3(CF_2)_5(CH_2)_2Si(OH)_3$
$CF_3(CF_2)_7(CH_2)_2Si(OH)_3$
$CF_3(CF_2)_3(CH_2)_3Si(OH)_3$
$CF_3(CF_2)_5(CH_2)_3Si(OH)_3$
$CF_3(CF_2)_7(CH_2)_3Si(OH)_3$
$CF_3(CF_2)_4O(CF_2)_2(CH_2)_2Si(OH)_3$
$CF_3(CF_2)_4O(CF_2)_2(CH_2)_3Si(OH)_3$
$CF_3(CF_2)_7(CH_2)_2O(CH_2)_3Si(OH)_3$
$CF_3(CF_2)_7CONH(CH_2)_2Si(OH)_3$
$CF_3(CF_2)_7CONH(CH_2)_3Si(OH)_3$
$CF_3(CF_2)_3O[CF(CF_3)CF(CF_3)O]_2CF(CF_3)CONH(CH_2)_3Si(OH)_3$
$CH_3(CH_2)_7Si(OH)_3$
$CH_3(CF_2)_7(CH_2)_2Si(OH)_3$
$CH_3(CF_2)_8(CH_2)_2Si(OH)_3$
$CH_3(CF_2)_9(CH_2)_2Si(OH)_3$
$CH_3CH_2(CF_2)_6(CH_2)_2Si(OH)_3$
$CH_3CH_2(CF_2)_8(CH_2)_2Si(OH)_3$
$CH_3CH_2(CF_2)_{10}(CH_2)_2Si(OH)_3$
$CH_3(CF_2)_4O(CF_2)_2(CH_2)_2Si(OH)_3$
$CH_3(CF_2)_7(CH_2)_2O(CH_2)_3Si(OH)_3$
$CH_3(CF_2)_8(CH_2)_2O(CH_2)_3Si(OH)_3$
$CH_3(CF_2)_9(CH_2)_2O(CH_2)_3Si(OH)_3$
$CH_3CH_2(CF_2)_6(CH_2)_2O(CH_2)_3Si(OH)_3$
$CH_3(CF_2)_6CONH(CH_2)_3Si(OH)_3$
$CH_3(CF_2)_8CONH(CH_2)_3Si(OH)_3$
$CH_3(CF_2)_3O[CF(CF_3)CF(CF_3)O]_2CF(CF_3)CONH(CH_2)_3Si(OH)_3$
$CF_3(CF_2)_3(CH_2)_2Si(CH_3)(OH)_2$
$CF_3(CF_2)_5(CH_2)_2Si(CH_3)(OH)_2$
$CF_3(CH_2)_2Si(CH_3)(OH)_2$
$CF_3(CF_2)_3(CH_2)_3Si(CH_3)(OH)_2$
$CF_3(CF_2)_5(CH_2)_3Si(CH_3)(OH)_2$
$CF_3(CF_2)_7(CH_2)_3Si(CH_3)(OH)_2$
$CF_3(CF_2)_4(CF_2)_2(CH_2)_2Si(CH_3)(OH)_2$
$CF_3(CF_2)_4(CF_2)_2(CH_2)_3Si(CH_3)(OH)_2$
$CF_3(CF_2)_4(CH_2)_2O(CH_2)_3Si(CH_3)(OH)_2$
$CF_3(CF_2)_7CONH(CH_2)_2Si(CH_3)(OH)_2$
$CF_3(CF_2)_7CONH(CH_2)_3Si(CH_3)(OH)_2$
$CF_3(CF_2)_3O[CF(CF_3)CF(CF_3)O]_2CF(CF_3)CONH(CH_2)_3Si(CH_3)(OH)_2$
$CH_3(CF_2)_7(CH_2)_2Si(CH_3)(OH)_2$

These compounds may be used alone or used by combination of two or more thereof.

2) Fluorine-Based Surface Treating Agent

The fluorine-based surface treating agent in the present invention may include, besides the above-mentioned silicon compound, a monomer and a polymer compound which each contain fluoroalkyl and/or poly(fluoroalkyleneoxy) and which are each terminated by a functional group such as a silicon compound, carboxylic acid, sulfonic acid or an alcohol.

Specific commercial product examples of the fluorine-based surface treating agent include Optool (registered trademark, Daikin Industries, Ltd.), Durasurf (registered trademark, Harves Co., Ltd.), Novec EGC-1720 (registered trademark, Sumitomo 3M Limited), Fluorosurf (registered trademark, Fluoro Technology), AsahiGuard (registered trademark, Asahi Glass Co., Ltd.), and SFcoat (registered trademark, AGC Seimi Chemical Co., Ltd.).

These fluorine-based surface treating agents may be used alone or as a mixture of two or more thereof.

3) Thiol Compound or Disulfide Compound

The thiol compound or the disulfide compound in the present invention is not particularly limited as long as it may be used for the surface treatment of the fishhook, but examples thereof include the following compounds.

The thiol compound includes:

alkanethiol such as methanethiol, ethanethiol, propanethiol and octadecylmercaptane;

aromatic thiol such as benzenethiol, chlorobenzenethiol, bromobenzenethiol, fluorobenzenethiol, pentafluorobenzenethiol, pentachlorobenzenethiol, nitrothiophenol, 2-mercapto-5-nitrobenzimidazole, perfluorodecanethiol, pentafluorothiophenol, 4-trifluoromethyl-2,3,5,6-tetrafluorothiophenol, 5-chloro-2-mercaptobenzimidazole, methoxybenzenethiol, naphthalenethiol, toluenethiol, aminothiophenol and methoxybenzenethiol;

a triazine thiol compound represented by the following general formula

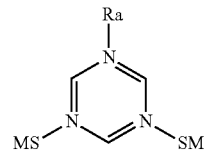

(wherein $R_a$ represents —SH, —OH, $NHR_2$, $NHR_3$ or $SR_2$; $R_2$ and $R_3$ are the same or different and each represent an alkyl group having 1 to 8 carbon atoms, a phenyl group or a benzyl group, and M represents —H, —Na, —K, or an amine group), such as triazine trithiol, triazine trithiol monosodium, triazine trithiol disodium, triazine trithiol di(diethanolamine), anilinotriazine dithiol and dibutylaminotriazine dithiol; and a polythiol compound represented by the following general formula

(wherein R represents a hydrocarbon group other than a heterocyclic ring, optionally including an ether bond, a sulfide bond and an organic functional group, and n represents an integer of 3 or more), such as pentaerythritol tetrakis(6-mercapto-5-hydroxy-2-methyl-3-oxahexyl)ether, pentaerythritol tetrakis(9-mercapto-8-hydroxy-2,5-dimethyl-3,6-dioxanonyl)ether, pentaerythritol tetrakis(12-mercapto-11-hydroxy-2,5,8-trimethyl-3,6,9-trioxadodecyl) ether, pentaerythritol tris(6-mercapto-5-hydroxy-2-methyl-3-oxahexyl)ether, pentaerythritol tris(9-mercapto-8-hydroxy-2,5-dimethyl-3,6-dioxanonyl)ether, pentaerythritol tris(12-mercapto-11-hydroxy-2,5,8-trimethyl-3,6,9-trioxadodecyl)ether, trimethylolpropane tris(6-mercapto-5-hydroxy-2-methyl-3-oxahexyl)ether, trimethylolpropane tris(9-mercapto-8-hydroxy-2,5-dimethyl-3,6-dioxanonyl)ether, trimethylolpropane tris(12-mercapto-11-hydroxy-2,5,8-trimethyl-3,6,9-trioxadodecyl)ether, pentaerythritol tetrakis(6-mercapto-4-thiahexyl)ether, pentaerythritol tris(6-mercapto-4-thiahexyl)ether, trimethylolpropane tris(6-mercapto-4-thiahexyl)ether, pentaerythritol tetrakismercaptoacetate, pentaerythritol tetrakismercaptopropionate, trimethylolpropane trismercaptoacetate, trimethylolpropane trismercaptopropionate, tris(6-mercapto-4-thiahexyl)isocyanurate, 1,2-dimercaptoethylthio-3-mercaptopropane, 1,2-bis-2-(mercaptoethylthio)-3-mercaptopropane, 1,2,3-trimercaptopropane.

The disulfide compound includes:
a disulfide compound represented by the following general formula

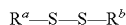

(wherein $R^a$ and $R^b$ each represents an alkyl group having 2 to 18 carbon atoms or an aryl group, and $R^a$ and $R^b$ is the same or different), such as diphenyl disulfide, tolyl disulfide, dibutyl disulfide and dioctadecyl disulfide. A disulfide compound obtained by oxidizing the thiol compound may also be specifically exemplified.

(2) Surface Treating Composition of Fishhook

As the composition for treating the surface of the fishhook, each surface treating compound described above is preferably used with being diluted with an organic solvent such as a hydrocarbon-based solvent, a fluorocarbon-based solvent and a silicone-based solvent, in particular, more preferably a hydrocarbon-based solvent, and further particularly preferably one having a boiling point of 100 to 250° C.

Furthermore, examples of such an organic solvent specifically include a hydrocarbon-based solvent such as n-hexane, cyclohexane, benzene, toluene, xylene, petroleum naphtha, solvent naphtha, petroleum ether, petroleum benzin, isoparaffin, normal paraffin, decalin, industrial gasoline, kerosene and ligroin; a chlorofluorocarbon-based solvent such as $CBr_2ClCF_3$, $CClF_2CF_2CCl_3$, $CClF_2CF_2CHFCl$, $CF_3CF_2CHCl_2$, $CF_3CBrFCBrF_2$, $CClF_2CClFCF_2CCl_3$, $Cl(CF_2CFCl)_2Cl$, $Cl(CF_2CFCl)_2CF_2CCl_3$, and $Cl(CF_2CFCl)_3Cl$, and a fluorocarbon-based solvent such as Fluorinert (product of 3M) and Afluid (product of Asahi Glass Co., Ltd.); and a silicone-based solvent such as dimethyl silicone, phenyl silicone, alkyl-modified silicon and polyether silicone. These solvents may be used alone or used by combination of two or more thereof.

The content of the surface treating compound of the fishhook, in the composition, is not particularly limited, but is preferably in the range of 0.1 to 30% by weight with respect to the entire composition from the viewpoint of production of a denser organic thin film.

In addition, when the surface treating compound is the metallic surfactant, the surface treating compound, to which other component is added, is preferably used, and may be prepared according to the method described in WO2003/076064, WO2004/091810, WO2006/009202, WO2008/059840 or WO2009/104424. Examples of a metallic surfactant-containing surface treating composition include SAMLAY (registered trademark, containing n-octadecyltrimethoxysilane, produced by Nippon Soda Co., Ltd.).

(3) Surface Treatment Method of Fishhook

The method of surface treatment of the fishhook with the composition will be described below.

The "fishhook for fishing or the like" in the present invention usually refers to one which has a shaft portion having a rear anchor for mounting a fishing line, and a folded portion curved from the tip of the shaft portion and extending from the tip, in which a tapered hook tip portion is formed at the tip of the folded portion, but it is not particularly limited as long as it has a shape which may be used for fishing or the like.

The material of the fishhook is carbon steel, stainless steel or the like, and may be plated with a metal such as nickel, tin, brass or gold.

In the case of a fishhook made of a material having no hydroxyl group on the surface thereof, a hydrophilic group may be introduced by subjecting the surface of the fishhook to a treatment in a plasma atmosphere including oxygen or a corona treatment, in advance. The hydrophilic group is preferably a hydroxyl group (—OH), but may be a functional group having active hydrogen, such as —COOH, —CHO, =NH or —NH$_2$.

If the shape thereof is complicated to thereby make it impossible to sufficiently perform the above operation, the fishhook may be cleaned with an alkali aqueous solution having an alkaline substance concentration of 1 to 20% by mass, for 1 to 60 minutes, to thereby result in decomposition of a lipid attached on the fishhook surface and also activation of the fishhook surface.

The alkaline aqueous solution to be used is not particularly limited as long as it presents alkalinity.

Examples include an aqueous solution containing, as the alkaline substance, an inorganic salt of an alkali metal. Examples of the inorganic salt include potassium hydroxide, sodium hydroxide, sodium carbonate, sodium phosphate, sodium silicate and sodium borate. In addition, the inorganic salt may be used with being, if necessary, mixed with a surfactant, a water-soluble organic solvent such as an alcohol or a ketone, ozone water, or hydrogen peroxide water as long as the object of the present invention is not impaired.

The alkaline substance concentration in the alkaline aqueous solution is preferably in the range of 1 to 20% by mass, and more preferably in the range of 1 to 10% by mass.

The method for cleaning the fishhook with the alkaline aqueous solution is not particularly limited as long as the fishhook is brought into contact with the alkaline aqueous solution, and for example, the fishhook may be sprayed or the like with the alkaline aqueous solution, or the fishhook may be immersed in the alkaline aqueous solution. The time during which the fishhook is brought into contact with the alkaline aqueous solution is not particularly limited, but is preferably in the range of 1 to 60 minutes and more preferably in the range of 5 to 30 minutes from the viewpoint of a balance among the efficiency and the cleaning effect of the cleaning treatment of the fishhook, and corrosion resistance of the fishhook. In addition, the fishhook is preferably subjected to an ultrasonic treatment in the state of being immersed in the alkaline aqueous solution because a better cleaning effect is achieved. The ultrasonic treatment conditions are not particularly limited, but a treatment where the frequency is 25 to 30 KHz, the treatment time is 1 to 20 minutes and the temperature is 20 to 50° C. is preferably exemplified.

In the present invention, it is preferable to further include a step of cleaning the fishhook with distilled water and/or a step of cleaning the fishhook with an organic solvent before and/or after the step of cleaning the fishhook with the alkali aqueous solution. It is thus made possible to more highly remove impurities on the fishhook surface, such as scrap, dust and organic substances, to thereby more densely and more tightly form an organic thin film. When both the step of cleaning with distilled water and the step of cleaning with an organic solvent are included, the step of cleaning with distilled water and the step of cleaning with an organic solvent may be included in any order, but the step of cleaning with an organic solvent is preferably included after the step of cleaning with distilled water. In addition, when the step of cleaning with distilled water and/or the step of cleaning with an organic solvent is included after the step of cleaning with the alkali aqueous solution, the step of cleaning with distilled water and/or the step of cleaning with an organic solvent may be included after the step of cleaning with an organic solvent, described later, but preferably included before the step of cleaning with an organic solvent, described later.

Here, distilled water for use in the cleaning step is not particularly limited, but distilled water having a resistivity of 10 MΩ or more is preferable and distilled water having a resistivity of 15 MΩ or more is more preferable from the viewpoint that a better cleaning effect is achieved.

In addition, the organic solvent for use in the cleaning step is not particularly limited, but is preferably an alcohol such as ethanol and isopropanol, and particularly preferably ethanol and isopropanol.

In addition, the cleaning method in each of the step of cleaning with distilled water and the step of cleaning with an organic solvent is not particularly limited, and for example, the fishhook may be sprayed or showered with distilled water or an organic solvent, or the fishhook may be immersed in distilled water or an organic solvent. The fishhook is preferably subjected to an ultrasonic treatment in the state of being immersed in distilled water or an organic solvent because a better cleaning effect is achieved. As specific conditions of the ultrasonic treatment, the same conditions as in the case of the ultrasonic treatment where the fishhook is immersed in ozone water or hydrogen peroxide water may be exemplified. In addition, when a physical method where the fishhook is exposed to ultraviolet light, ozone or plasma is used in combination, a further better cleaning effect is achieved.

The method for bringing the surface treating composition into contact with the fishhook surface is not particularly limited, and a known method may be used. Specifically, examples include a dipping method, a spin-coating method, a spraying method, a roller-coating method, a Meyer bar method, a screen printing method and a brush painting method, and among them, a dipping method is preferable.

The temperature at which the surface treating composition is brought into contact with the fishhook surface is not particularly limited as long as stability of the solution in the present invention is kept. The temperature may be usually in the range of room temperature to the reflux temperature of the solvent used for preparation of the solution. In order that the temperature is a suitable temperature for such contact, the surface treating composition may be heated or the fishhook by itself may be heated.

In addition, ultrasonic wave may also be used in order to promote film formation. The step of bringing into contact with the fishhook surface may be performed at one time for a long time or may be performed in portions with coating for a short time being performed several times.

After the surface treating composition is brought into contact with the fishhook surface, a cleaning step may also be provided in order to remove an excess reagent, impurities or the like attached onto the film surface. Such a cleaning step may be provided to thereby more control the film thickness. In the step of cleaning with an organic solvent, the organic solvent is not particularly limited, but is preferably a hydrocarbon-based solvent such as hexane, heptane, octane, nonane, decane, benzene, toluene or xylene. The cleaning method is not particularly limited as long as it is a method which is capable of removing any substance attached onto the surface. Specifically, examples include a method where the fishhook is immersed in a solvent which may dissolve the surface treating composition used; a method where such a solvent is left to stand in the atmosphere under vacuum or ordinary pressure and thus evaporated; and a method where an inert gas such as dry nitrogen gas is blown for blowing away. In addition, a more preferable method includes a method where the fishhook is subjected to an ultrasonic treatment in the state of being immersed in the above-mentioned organic solvent, because a better cleaning effect is achieved.

A step of drying the fishhook cleaned with an organic solvent is preferably further included after the step of cleaning with an organic solvent. The drying method is not particularly limited, and a method may be exemplified where the solution on the fishhook surface may be swept by an air knife, may be naturally dried, or may be subjected to warm air, but a method is preferable where warm air is applied, because heat is applied to the organic thin film formed on the fishhook surface, to thereby more stabilize the organic thin film.

Herein, the organic thin film is more stabilized than the case where no heat is applied to the fishhook in drying of the fishhook, and therefore a step of applying heat to the fishhook is preferably further included. The heating temperature may be appropriately selected depending on the material of the fishhook and stability of the organic thin film, but may preferably include a temperature in the range of 40 to 70° C.

(4) Surface Treatment to be Performed Before Treatment with Surface Treating Composition In the case of a fishhook made of a material having no active hydrogen on the surface thereof, the surface of the fishhook may also be brought into contact with at least one compound selected from $SiCl_4$, $SiHCl_3$, $SiH_2Cl_2$ and Cl—$(SiCl_2O)_c$—$SiCl_3$ (wherein c represents 0 or a natural number.), in advance, and thereafter subjected to dehydrochlorination, to thereby allow a silica underlayer having active hydrogen to be formed on the surface.

In addition, in the case of a fishhook subjected to clear coating, color coating or the like, such a fishhook is preferably subjected, in advance, to a surface treatment with a thin film-forming composition containing (a) an epoxy group-containing trialkoxysilane hydrolysis condensate, (b) an alcohol having 1 to 5 carbon atoms, and/or an organic acid whose pKa at 25° C. is in the range of 2.0 to 6.0, and (c) a polyamine. Hereinafter, the thin film-forming composition for use in the present invention will be described.

1) Epoxy Group-Containing Trialkoxysilane Hydrolysis Condensate

The epoxy group-containing trialkoxysilane hydrolysis condensate (a) is a polymer or an oligomer where epoxy group-containing trialkoxysilane is condensed.

Epoxy group-containing trialkoxysilane and/or a hydrolysis condensate thereof, serving as raw material(s), for use in production of the epoxy group-containing trialkoxysilane hydrolysis condensate for use in the method according to the present invention is not particularly limited with respect to the structure thereof as long as it is trialkoxysilane including an epoxy group at a portion other than a functional group portion to be converted due to hydrolysis or the like, but, for example, a compound represented by the following formula (I-1) or (I-2) may be exemplified.

$$R^s\text{—}Si(OR^t)_3 \tag{I-1}$$

$$R^s\text{—}Si(OR^t)_2\text{—}O\text{—}Si(OR^t)_2R^s \tag{I-2}$$

In the formulae, $R^s$ represents a hydrocarbon group which has an epoxy group or a glycidoxy group and which is optionally substituted by a group other than such groups, and $R^t$ represents an optionally substituted alkyl group having 1 to 10 carbon atoms.

$R^s$ may include one or more epoxy groups or glycidoxy groups, preferably includes 1 to 3 epoxy groups or glycidoxy groups, and may include both an epoxy group and a glycidoxy group.

As the "hydrocarbon group" of the "hydrocarbon group having an epoxy group or a glycidoxy group" in $R^s$, specifically, an alkyl group, a cycloalkyl group, a cycloalkylalkyl group, an alkenyl group, a cycloalkenyl group, an alkynyl group, an aryl group, an arylalkyl group, an arylalkenyl group or the like may be exemplified, and the number of carbon atoms is preferably in the range of 1 to 30 and further preferably in the range of 1 to 10.

As the "alkyl group", specifically, a methyl group, an ethyl group, a n-propyl group, an isopropyl group, a n-butyl group, an isobutyl group, a s-butyl group, a t-butyl group, a n-pentyl group, an isopentyl group, a neopentyl group, a n-hexyl group, an isohexyl group, a n-heptyl group, a n-octyl group, a n-nonyl group, an isononyl group, a n-decyl group, a lauryl group, a tridecyl group, a myristyl group, a pentadecyl group, a palmityl group, a heptadecyl group, a stearyl group or the like may be exemplified.

As the "cycloalkyl group", specifically, a cyclopropyl group, a cyclobutyl group, a cyclopentyl group, a cyclohexyl group, a cycloheptyl group, a cyclooctyl group or the like may be exemplified.

The "cycloalkylalkyl group" is a group where a cycloalkyl group and an alkyl group are bound, and is preferably a group where a cycloalkyl group having 3 to 10 carbon atoms and an alkyl group having 1 to 10 carbon atoms are bound.

As the "alkenyl group", specifically, a vinyl group, a prop-1-en-1-yl group, an allyl group, a but-1-en-1-yl group, a but-2-en-1-yl group, a but-3-en-1-yl group, a but-1-en-2-yl group, a but-3-en-2-yl group, a pent-1-en-1-yl group, a pent-4-en-1-yl group, a pent-1-en-2-yl group, a pent-4-en-2-yl group, a 3-methyl-but-1-en-1-yl group, a hex-1-en-1-yl group, a hex-5-en-1-yl group, a hept-1-en-1-yl group, a kept-6-en-1-yl group, an oct-1-en-1-yl group, an oct-7-en-1-yl group, a but-1,3-dien-1-yl group or the like may be exemplified.

As the "cycloalkenyl group", specifically, a 1-cyclopenten-1-yl group, a 2-cyclopenten-1-yl group, a 1-cyclohexen-1-yl group, a 2-cyclohexen-1-yl group, a 3-cyclohexen-1-yl group or the like may be exemplified.

As the "alkynyl group", specifically, an ethynyl group, a prop-1-yn-1-yl group, a prop-2-yn-1-yl group, a but-1-yn-1-yl group, a but-3-yn-1-yl group, a pent-1-yn-1-yl group, a pent-4-yn-1-yl group, a hex-1-yn-1-yl group, a hex-5-yn-1-yl group, a kept-1-yn-1-yl group, an oct-1-yn-1-yl group, an oct-7-yn-1-yl group or the like may be exemplified.

The "aryl group" means a monocyclic or polycyclic aryl group, and when a polycyclic aryl group is meant, it encompasses not only a fully unsaturated group, but also a partially saturated group. Specifically, a phenyl group, a naphthyl group, an azulenyl group, an indenyl group, an indanyl group, a tetralinyl group or the like may be exemplified.

The "arylalkyl group" refers to a group where an aryl group and an alkyl group are bound, and is preferably a group where an aryl group having 6 to 10 carbon atoms and an alkyl group having 1 to 10 carbon atoms are bound.

The "arylalkenyl group" refers to a group where an aryl group and an alkenyl group are bound, and is preferably a group where an aryl group having 6 to 10 carbon atoms and an alkenyl group having 2 to 10 carbon atoms are bound.

The above-mentioned "hydrocarbon group" is optionally substituted by a group other than an epoxy group and a glycidoxy group, and as such other group, specifically, a halogen atom, an alkyl group, an alkenyl group, an alkoxy group, a (meth)acryloxy group or the like may be exemplified.

Here, as the halogen atom, specifically, a fluorine atom, a chlorine atom, a bromine atom, an iodine atom or the like may be exemplified.

As the alkoxy group, specifically, a methoxy group, an ethoxy group, a n-propoxy group, an isopropoxy group, a n-butoxy group, an isobutoxy group, a t-butoxy group or the like may be exemplified.

As the alkyl group and the alkenyl group, the same specific examples as in the alkyl group and the alkenyl group in R above may be exemplified.

As the "alkyl group having 1 to 10 carbon atoms" in the "optionally substituted alkyl group having 1 to 10 carbon atoms" in $R^t$, the same as in the alkyl group having 1 to 10 carbon atoms in R above may be exemplified.

As the "substituent" with respect to the "optionally substituted", specifically, a halogen atom, an alkoxy group, a (meth)acryloxy group or the like may be exemplified. As the halogen atom and the alkoxy group, specifically, the same specific examples as in the halogen atom and the alkoxy group exemplified as the group other than an epoxy group and a glycidoxy group in R above may be exemplified.

As the epoxy group-containing trialkoxysilane or hydrolysis condensate thereof, serving as raw material(s), specifically, glycidoxyalkyltrialkoxysilane or glycidoxyalkenylalkoxysilane is preferable. These compounds may be used alone or as a mixture of two or more thereof.

Specific examples may include 2-(3,4-epoxycyclohexyl)ethyltrimethoxysilane, 3-glycidoxy-n-propyltrimethoxysilane, 3-glycidoxy-n-propylmethyldiethoxysilane and 3-glycidoxypropyltriethoxysilane.

2) Method for Producing Epoxy Group-Containing Trialkoxysilane Hydrolysis Condensate The epoxy group-containing trialkoxysilane hydrolysis condensate in the present invention may be produced by a conventionally known method or the like.

Specifically, a method may be exemplified where the epoxy group-containing trialkoxysilane and/or hydrolysis condensate thereof, serving as raw material(s), water, polyamine, and, if necessary, an acid and an organic solvent are mixed and stirred, but the order of mixing and the stirring rate are not particularly limited, and any order or any rate may be set. The temperatures in mixing and stirring are not particularly limited, and such mixing and stirring are preferably performed in the temperature range from room temperature to the boiling point of a solvent to be used, and further preferably performed at room temperature. The term "room temperature" here refers to any outside air temperature where such mixing and stirring are performed, but is preferably a temperature in the range of 15 to 35° C.

All the epoxy group-containing trialkoxysilane, water and polyamine which coexist are preferably stirred at room temperature for 2 hours to 3 hours. After hydrolysis, the resultant is diluted with an organic solvent or water, if necessary.

The amount of water to be used is not particularly limited as long as it allows hydrolysis and condensation of the epoxy group-containing trialkoxysilane and/or hydrolysis condensate thereof to be used, to be made at certain levels, and specifically, the amount is preferably 0.5 mol or more, and further preferably 1.0 mol or more, 2.0 mol or more, 5.0 mol or more, or 10 mol or more with respect to 1 mol of the epoxy group-containing trialkoxysilane and/or hydrolysis condensate thereof to be used.

3) Polyamine

The polyamine for use in the present invention is not particularly limited as long as it is a compound having, in one molecule, two or more amino groups or imino groups to which one or more hydrogen atoms are bound, and specifically, ethylenediamine, trimethylenediamine, tetramethylenediamine, hexamethylenediamine, diethylenetriamine, triethylenetetramine, tetraethylenepentamine, dipropylenetriamine, methylaminopropylamine, ethylaminopropylamine, N,N'-dimethylhexamethylenediamine, bis(2-methylaminoethyl)ether, menthanediamine, isophoronediamine, 3,9-bis(3-aminopropyl)-2,4,8,10-tetraoxyspiro(5,5)undecane adduct, bis(4-aminocyclohexyl)methane, o-phenylenediamine, m-phenylenediamine, p-phenylenediamine, diaminodiphenylmethane, diaminodiphenylsulfone, m-xylenediamine or the like may be exemplified and these compounds may be used alone or as a mixture of two or more thereof. Among them, polyalkylenepolyamine is preferable, and specifically, diethylenetriamine, triethylenetetramine, tetraethylenepentamine, dipropylenetriamine or the like may be exemplified.

The amount of the polyamine to be used is not particularly limited, but the polyamine is preferably used at 1/(total number of hydrogen atoms on all nitrogen atoms in one polyamine molecule) mol or more with respect to 1 mol of the epoxy group in the epoxy group-containing trialkoxysilane and/or hydrolysis condensate thereof, and is used in an amount in the range of 1.2 times to 10 times by mol and preferably in the range of 1.5 times to 5 times by mol or 1.8 times to 2.5 times by mol relative to 1/(total number of hydrogen atoms on all nitrogen atoms in one polyamine molecule). If the amount to be used is less than 1/(total number of hydrogen atoms on all nitrogen atoms in one polyamine molecule) mol, curing may be insufficient not to provide a film having high hardness, and if the amount is more than 10 times by mol relative to 1/(total number of hydrogen atoms on all nitrogen atoms in one polyamine molecule), the polyamine may remain not to provide a film having sufficient hardness.

4) Alcohol Having 1 to 5 Carbon Atoms

The alcohol for use in the composition of the present invention is not particularly limited as long as it has 1 to 5 carbon atoms, and specifically, methanol, ethanol, n-propanol, isopropanol, n-butanol, s-butanol, t-butanol, isobutanol, n-pentanol, isopentanol, s-pentanol, t-pentanol, neopentyl alcohol or the like may be exemplified, and n-pentanol is preferable in consideration of long-term storage stability.

The amount of the alcohol having 1 to 5 carbon atoms, to be used, may be in the same range as in an organic solvent described later, and specifically, 3% by mass or more is preferable and 4% by mass or more is further preferable with respect to the entire composition.

5) Organic Acid

The organic acid for use in the composition of the present invention is not particularly limited as long as it is an organic acid whose pKa at 25° C. is in the range of 2.0 to 6.0 and preferably in the range of 3.0 to 5.0, and specifically, formic acid, acetic acid, propionic acid, butyric acid, isobutyric acid, valeric acid, isovaleric acid, caproic acid, isocaproic acid, chloroacetic acid, fluoroacetic acid, bromoacetic acid, 3-chloropropionic acid, 2-bromopropionic acid, 2-hydroxybutyric acid, phenylacetic acid, phenylpropionic acid, 4-phenylbutyric acid, phenoxyacetic acid, cyanoacetic acid, oxalic acid, malonic acid, 2,2-dimethylmalonic acid, adipic acid, succinic acid, pimelic acid, phthalic acid, glutaric acid, oxaloacetic acid, citric acid, isocitric acid, cyclohexane-1,1-dicarboxylic acid, tartaric acid, o-anisic acid, m-anisic acid, p-anisic acid, benzoic acid, o-chlorobenzoic acid, m-fluorobenzoic acid, 2,3-difluorobenzoic acid, o-nitrobenzoic acid, m-nitrobenzoic acid, p-nitrobenzoic acid, m-aminobenzoic acid, p-aminobenzoic acid, salicylic acid, phthalic acid, isophthalic acid, trans-cinnamic acid, 2-furancarboxylic acid, glyoxylic acid, glycolic acid, crotonic acid, lactic acid, 2-hydroxy-2-methylpropionic acid, pyruvic acid, mandelic acid, malic acid, levulinic acid, 2,6-pyridinedicarboxylic acid, nicotinic acid or the like may be exemplified, and among them, aliphatic monocarboxylic acid, or benzoic acid or substituted benzoic acid may be preferably exemplified.

The amount of the acid to be used is not particularly limited, but is preferably in the range of 0.3 to 1.2 mol, further preferably in the range of 0.5 to 1.0 mol or 0.6 to 0.9 mol with respect to 1 mol of the polyamine to be used.

If the amount is less than 0.3 mol, storage stability of the composition may be deteriorated, and if the amount is more than 1.2 mol, no coating film having sufficient hardness may be formed.

6) Solid Content Concentration in Composition

The solid content concentration in the composition of the present invention is not particularly limited, but is preferably in the range of 0.01 to 3.0% by mass and further preferably in the range of 0.05 to 2.0% by mass, 0.05 to 1.0% by mass or 0.1 to 0.5% by mass in consideration of appearance, coatability and curability of the thin film, properties of the thin film, storage stability of the composition, or the like.

In order to adjust the solid content concentration in the composition, an organic solvent may be used. Such a solvent is not particularly limited as long as it is a solvent which enables uniformity, stability, or the like of a solution to be maintained, but alcohol, ether, ketone, ester, amide or the like may be exemplified, and an alcohol having 1 to 5 carbon atoms is preferable. These compounds may be used alone or used by combination of two or more thereof.

Water is preferably used as other solvent, and if so, the organic solvent to be used is preferably an organic solvent soluble in water. The amounts of the organic solvent and water to be used may be appropriately determined as long as such amounts allow the solid content concentration to be adjusted in the above range.

7) Production of Composition

The method for producing the composition of the present invention is not particularly limited, but any of the following methods or the like may be specifically exemplified.

i) The epoxy group-containing trialkoxysilane and/or hydrolysis condensate thereof, water and, if necessary, an organic solvent are mixed and stirred at room temperature, the polyamine and, if necessary, the organic acid are then added thereto, and the resultant is diluted with an organic solvent and, if necessary, water.

ii) The epoxy group-containing trialkoxysilane and/or hydrolysis condensate thereof, water, an organic solvent, and the polyamine are mixed and stirred at room temperature, the organic acid is, if necessary, further added thereto, and furthermore the resultant is diluted with an organic solvent and, if necessary, water.

iii) The epoxy group-containing trialkoxysilane and/or hydrolysis condensate thereof, water, an alcohol as a solvent, the polyamine, and, if necessary, the organic acid are mixed and stirred at room temperature, and furthermore the resultant is diluted with an organic solvent and, if necessary, water.

iv) The epoxy group-containing trialkoxysilane, water, an alcohol as a solvent, the polyamine, and, if necessary, an organic acid are mixed and stirred at room temperature.

The stirring temperature is not particularly limited, but is preferably in the range of room temperature to the boiling point of a solvent to be used, and further preferably room temperature. In this case, the term "room temperature" refers to the outside air temperature of a place where stirring is performed, but is preferably in the range of 15 to 35° C.

8) Surface Treatment Method

The thin film-forming composition of the present invention may be used to coat the surface of the fishhook as a subject by any known coating procedure such as a brush, spray or dipping to thereby form a thin film. Drying may be conducted by drying at room temperature and/or heating. Specifically, drying is conducted at 20° C. to 250° C., preferably 20° C. to 150° C., for about 10 seconds to 24 hours, preferably about 30 seconds to 10 hours.

A thin film to be obtained is not particularly limited, but preferably has a thickness of more than 10 nm and 5 µm or less.

After formation of the thin film, the thin film surface is preferably partially oxidized by the treatment in a plasma atmosphere including oxygen, the corona treatment or the like, to thereby introduce a hydrophilic group to the thin film surface.

Hereinafter, the present invention will be specifically described with reference to Examples, but the technical scope of the present invention is not limited thereto.

EXAMPLES

Example 1

In a glass vessel were placed 100 ayu hooks (XP Air Speed, size: 6.5, manufactured by Globeride, Inc.), and ultrasonic cleanings with toluene four times, with acetone twice, with pure water once, and with isopropanol (hereinafter, sometimes referred to as "IPA".) once were performed in advance for 10 minutes with respect to each cleaning.

Each of the ayu hooks where the ultrasonic cleanings were completed was thereafter dried at 60° C. for 30 minutes, and subjected to an immersion treatment with an aqueous 1 M-sodium metasilicate solution at ordinary temperature for 30 minutes.

After the treatment with the aqueous sodium metasilicate solution, the resultant was sufficiently cleaned with pure water to remove the aqueous sodium metasilicate solution, and further cleaned with IPA and dried at 60° C. for 30 minutes.

The resultant was then immersed in a surface treating composition (SAMLAY (registered trademark), produced by Nippon Soda Co., Ltd.) for 30 minutes, and thereafter cleaned with n-decane and dried at 60° C. for 30 minutes, to provide ayu hook 1 where an organic thin film was formed.

Example 2

In a glass vessel were placed 100 nickel-plated ayu hooks (XP Air Speed, size: 6.5, manufactured by Globeride, Inc.), and ultrasonic cleanings with toluene four times, with acetone twice, with pure water once, and with IPA once were performed in advance for 10 minutes with respect to each cleaning.

Each of the ayu hooks where the ultrasonic cleanings were completed was thereafter dried at 60° C. for 30 minutes, and subjected to an immersion treatment with an aqueous 1 M-sodium metasilicate solution at ordinary temperature for 30 minutes.

After the treatment with the aqueous sodium metasilicate solution, the resultant was sufficiently cleaned with pure water to remove the aqueous sodium metasilicate solution, and further cleaned with IPA and dried at 60° C. for 30 minutes.

The resultant was then immersed in a surface treating composition (SAMLAY (registered trademark), produced by Nippon Soda Co., Ltd.) for 30 minutes, and thereafter cleaned with n-decane and dried at 60° C. for 30 minutes, to provide ayu hook 2 where an organic thin film was formed.

Example 3

In a glass vessel were placed 100 nickel-plated ayu hooks (XP Air Speed, size: 6.5), and ultrasonic cleanings with toluene four times, with acetone twice, with pure water once, and with IPA once were performed in advance for 10 minutes with respect to each cleaning.

Each of the ayu hooks where the ultrasonic cleanings were completed was thereafter dried at 60° C. for 30 minutes, and subjected to an immersion treatment with an aqueous 1 M-sodium metasilicate solution at ordinary temperature for 30 minutes.

After the treatment with the aqueous sodium metasilicate solution, the resultant was sufficiently cleaned with pure water to remove the aqueous sodium metasilicate solution, and further cleaned with IPA and dried at 60° C. for 30 minutes.

The resultant was then immersed in a surface treating composition prepared by using nonafluorohexyltrimethoxysilane according to the method described in Japanese Patent No. 4995467, for 30 minutes, and thereafter cleaned with HFE-7300 (produced by Sumitomo 3M Limited) and dried at 60° C. for 30 minutes, to provide ayu hook 3 where a fluorine-based organic thin film was formed.

Example 4

In a glass vessel were placed 100 nickel-plated ayu hooks (XP Air Speed, size: 6.5, manufactured by Globeride, Inc.), and ultrasonic cleanings with toluene four times, with acetone twice, with pure water once, and with IPA once were performed in advance for 10 minutes with respect to each cleaning.

Each of the ayu hooks where the ultrasonic cleanings were completed was thereafter dried at 60° C. for 30 minutes, and subjected to an immersion treatment with an aqueous 1 M-sodium metasilicate solution at ordinary temperature for 30 minutes.

After the treatment with the aqueous sodium metasilicate solution, the resultant was sufficiently cleaned with pure water to remove the aqueous sodium metasilicate solution, and further cleaned with IPA and dried at 60° C. for 30 minutes.

The resultant was then immersed in a fluorine-based surface treating agent (Novec (registered trademark) EGC-1720 (produced by Sumitomo 3M Limited) for 30 minutes, and thereafter dried at 60° C. for 30 minutes, to provide ayu hook 4 where a fluorine-based organic thin film was formed.

Example 5

In a glass vessel were placed 100 gold-plated deepbodied crucian carp hooks, and ultrasonic cleanings with toluene four times, with acetone twice, with pure water once, and with IPA once were performed in advance for 10 minutes with respect to each cleaning.

Each of the deepbodied crucian carp hooks where the ultrasonic cleanings were completed was thereafter dried at 60° C. for 30 minutes, and subjected to an immersion treatment with 30% hydrogen peroxide water at ordinary temperature for 30 minutes.

After the treatment with 30% hydrogen peroxide water, the resultant was sufficiently cleaned with pure water, and further cleaned with IPA and dried at 60° C. for 30 minutes.

The resultant was then immersed in a solution of 0.5% octadecanethiol in toluene for 30 minutes, and thereafter cleaned with toluene and dried at 60° C. for 30 minutes, to provide deepbodied crucian carp hook 1 where a thiol-based organic thin film was formed.

[Test Example 1] Evaluation (1) by Prick Test

Each of the hooks where an organic thin film was formed was subjected to measurements of sticking stress and piercing stress by a prick test to a film and various materials, and evaluated. FIG. 1 represents the test results about ayu hook 1 obtained in Example 1. As the tester, a precision universal tester (manufactured by Shimadzu Corporation) was used.

Each of ayu hooks 1 to 4, and deepbodied crucian carp hook 1 in Examples 1 to 5, where an organic thin film was formed, was used to perform a prick test to Cellotape (registered trademark) (tape width: 18 mm, manufactured by Nichiban Co., Ltd.) as a material. Respective sticking and piercing stresses are shown in Table 1 and Table 2. Each of the hooks was compared with a fishhook not treated, to thereby determine the reduction rate.

TABLE 1

Sticking stress

| | Stress of hook with organic thin film formed (gf) | Stress of hook not treated (gf) | Reduction rate of sticking stress |
|---|---|---|---|
| Ayu hook 1 | 15.5 | 18.2 | 15% |
| Ayu hook 2 | 14.2 | 14.8 | 4% |
| Ayu hook 3 | 14.8 | 14.8 | 0% |
| Ayu hook 4 | 17.6 | 14.8 | −19% |
| Deepbodied crucian carp hook 1 | 20.0 | 20.0 | 0% |

TABLE 2

Piercing stress

| | Stress of hook with organic thin film formed (gf) | Stress of hook not treated (gf) | Reduction rate of piercing stress |
|---|---|---|---|
| Ayu hook 1 | 15.0 | 35.0 | 57% |
| Ayu hook 2 | 16.0 | 25.0 | 36% |
| Ayu hook 3 | 23.0 | 25.0 | 8% |
| Ayu hook 4 | 16.7 | 25.0 | 33% |
| Deepbodied crucian carp hook 1 | 19.0 | 26.0 | 27% |

[Test Example 2] Evaluation (2) by Prick Test

The same manner as in Test Example 1 was performed except that Japanese paper (width: 20 mm, manufactured by Onao Co., Ltd.) was used as a material, to thereby measure the piercing stress of each of ayu hooks 1 and 2. The results are shown in Table 3.

TABLE 3

Piercing stress

| | Stress of hook with organic thin film formed (gf) | Stress of hook not treated (gf) | Reduction rate of piercing stress |
|---|---|---|---|
| Ayu hook 1 | 22.0 | 37.0 | 40% |
| Ayu hook 2 | 22.0 | 48.0 | 54% |

Example 6

To a solution obtained by dissolving 4.95 g of benzoic acid in 277.23 g of IPA were added 4.95 g of diethylenetriamine and 693.07 g of water, and mixed. Furthermore, 19.80 g of 3-glycidoxypropyl trimethoxysilane was added to the solution, and subjected to a reaction at room temperature for 2 hours to thereby prepare composition [A-1] having a solid content concentration of 3% on a mass basis.

With a solvent, where 12.86 g of propylene glycol monomethyl ether and 32.14 g of water were mixed, was diluted 5.0 g of composition [A-1] obtained, to provide thin film-forming composition [X-1] having a solid content concentration of 0.3% on a mass basis.

The surface of ayu hook (Sokko S) clear coated, subjected to cleaning by pouring of pure water and IPA in this order in advance, was dip-coated with thin film-forming composition [X-1], and thereafter heated and dried at 100° C. for 10 minutes to thereby produce fishhook [Y-1]. Subsequently, fishhook [Y-1] obtained was treated by UV ozone cleaning (about 12000 mJ/cm$^2$) for 10 minutes.

Fishhook [Y-1] above subjected to UV ozone cleaning was immersed in a surface treating composition (SAMLAY (registered trademark), produced by Nippon Soda Co., Ltd.) for 10 minutes. Thereafter, the surface of the fishhook was cleaned by pouring of a hydrocarbon-based cleaning agent (NS Clean 100, produced by JX Nippon Oil & Energy Corporation) and dried at 60° C. for 20 minutes, to provide the fishhook of the present invention.

Example 7

The surface of a Japanese bluefish hook being clear coated on a gold plating, subjected to cleaning by pouring of pure water and IPA in this order in advance, was dip-coated with thin film-forming composition [X-1], and thereafter heated and dried at 100° C. for 10 minutes to thereby produce fishhook [Y-1]. Subsequently, fishhook [Y-1] obtained was treated by UV ozone cleaning (about 12000 mJ/cm$^2$) for 10 minutes.

Fishhook [Y-1] above subjected to UV ozone cleaning was immersed in a surface treating composition (SAMLAY (registered trademark), produced by Nippon Soda Co., Ltd.) for 10 minutes. Thereafter, the surface of the fishhook was cleaned by pouring of a hydrocarbon-based cleaning agent (NS Clean 100, produced by JX Nippon Oil & Energy Corporation) and dried at 60° C. for 20 minutes, to provide the fishhook of the present invention.

Example 8

The surface of a Japanese bluefish hook red coated, subjected to cleaning by pouring of pure water and IPA in this order in advance, was dip-coated with thin film-forming composition [X-1], and thereafter heated and dried at 100°

C. for 10 minutes to thereby produce fishhook [Y-1]. Subsequently, fishhook [Y-1] obtained was treated by UV ozone cleaning (about 12000 mJ/cm$^2$) for 10 minutes.

Fishhook [Y-1] above subjected to UV ozone cleaning was immersed in a surface treating composition (SAMLAY (registered trademark), produced by Nippon Soda Co., Ltd.) for 10 minutes. Thereafter, the surface of the fishhook was cleaned by pouring of a hydrocarbon-based cleaning agent (NS Clean 100, produced by JX Nippon Oil & Energy Corporation) and dried at 60° C. for 20 minutes, to provide the fishhook of the present invention.

Example 9

The surface of a triple hook clear coated with tin plating, subjected to cleaning by pouring of pure water and IPA in this order in advance, was dip-coated with thin film-forming composition [X-1], and thereafter heated and dried at 100° C. for 10 minutes to thereby produce fishhook [Y-1]. Subsequently, fishhook [Y-1] obtained was treated by UV ozone cleaning (about 12000 mJ/cm$^2$) for 10 minutes.

Fishhook [Y-1] above subjected to UV ozone cleaning was immersed in a surface treating composition (SAMLAY (registered trademark), produced by Nippon Soda Co., Ltd.) for 10 minutes. Thereafter, the surface of the fishhook was cleaned by pouring of a hydrocarbon-based cleaning agent (NS Clean 100, produced by JX Nippon Oil & Energy Corporation) and dried at 60° C. for 20 minutes, to provide the fishhook of the present invention.

[Test Example 3] Evaluation (3) by Prick Test

The ayu hook in Example 6, where an organic thin film was formed, was subjected to a prick test to Cellotape (registered trademark) (tape width: 18 mm, manufactured by Nichiban Co., Ltd.) as a material. Respective sticking and piercing stresses are shown in Table 4 and Table 5. The hook was compared with a fishhook not treated, to thereby determine the reduction rate.

[Test Example 4] Evaluation (4) by Prick Test

Each of the hooks in Examples 7 to 9, where an organic thin film was formed, was subjected to a prick test to a silicon sheet (1.0 mm in thickness) as a material. Respective sticking and piercing stresses are shown in Table 4 and Table 5. Each of the hooks was compared with a fishhook not treated, to thereby determine the reduction rate.

TABLE 4

| | Stress of hook with organic thin film formed (gf) | Stress of hook not treated (gf) | Reduction rate of sticking stress |
|---|---|---|---|
| Ayu hook "Sokko S" | 11.5 | 15.5 | 26% |
| Japanese bluefish (Gold) | 104.3 | 130.2 | 20% |
| Japanese bluefish (Red) | 95.6 | 102.7 | 7% |
| Triple hook (Sn) | 99.4 | 115.1 | 14% |

TABLE 5

| | Stress of hook with organic thin film formed (gf) | Stress of hook not treated (gf) | Reduction rate of piercing stress |
|---|---|---|---|
| Ayu hook "Sokko S" | 13.2 | 24.3 | 46% |
| Japanese bluefish (Gold) | 50.4 | 78.8 | 36% |
| Japanese bluefish (Red) | 44.0 | 69.9 | 37% |
| Triple hook (Sn) | 93.4 | 141.7 | 34% |

It has been found from the foregoing results that an organic thin film is formed to make it possible to form a hook where the piercing stress is reduced.

The invention claimed is:
1. A fishhook subjected to a surface treatment with a compound selected from the group consisting of:
   a metallic surfactant represented by formula (I):

$$R^1_n MX_{m-n} \tag{I}$$

wherein:
   R$^1$ represents a hydrocarbon group having 1 to 30 carbon atoms and optionally having a substituent, a halogenated hydrocarbon group having 1 to 30 carbon atoms and optionally having a substituent, a linking group-containing hydrocarbon group having 1 to 30 carbon atoms, or a linking group-containing halogenated hydrocarbon group having 1 to 30 carbon atoms,
   M represents at least one metal atom selected from the group consisting of a silicon atom, a germanium atom, a tin atom, a titanium atom, and a zirconium atom,
   X represents a hydroxyl group or a hydrolyzable group,
   m represents an atomic valence of M, and
   n represents any positive integer of 1 to (m-1), wherein
      when n is 2 or more, each R$^1$ is the same or different, and
      when (m-n) is 2 or more, each X is the same or different, provided that at least one of X represents a hydroxyl group or a hydrolyzable group,
   a fluorine-based surface treating agent,
   a thiol compound, and
   a disulfide compound.
2. The fishhook according to claim 1, wherein the fishhook is a fishhook preliminarily subjected to a surface treatment with a thin film-forming composition containing:
   (a) an epoxy group-containing trialkoxysilane hydrolysis condensate;
   (b) an alcohol having 1 to 5 carbon atoms, and/or an organic acid whose pKa at 25° C. is in the range of 2.0 to 6.0; and
   (c) a polyamine.

* * * * *